(12) United States Patent
Sobel et al.

(10) Patent No.: US 12,169,420 B2
(45) Date of Patent: *Dec. 17, 2024

(54) TIMEBASE SYNCHRONIZATION USING PULSED SIGNAL INJECTION

(71) Applicant: Waymo LLC, Mountain View, CA (US)

(72) Inventors: David Sobel, Los Altos, CA (US); Pieter Kaspenberg, Santa Clara, CA (US); Pierre-Yves Droz, Los Altos, CA (US); Srikanth Muroor, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/473,591

(22) Filed: Sep. 25, 2023

(65) Prior Publication Data

US 2024/0012447 A1    Jan. 11, 2024

Related U.S. Application Data

(63) Continuation of application No. 17/647,633, filed on Jan. 11, 2022, now Pat. No. 11,822,377.

(51) Int. Cl.
*G06F 1/12* (2006.01)
(52) U.S. Cl.
CPC ..................... *G06F 1/12* (2013.01)
(58) Field of Classification Search
CPC ................. G06F 1/32; G06F 1/12; G06F 9/44
See application file for complete search history.

(56) References Cited

U.S. PATENT DOCUMENTS

| 6,442,644 B1 * | 8/2002 | Gustavson | G11C 7/1087 365/194 |
| 8,521,811 B2 * | 8/2013 | Shah | H04N 21/4828 709/224 |

(Continued)

FOREIGN PATENT DOCUMENTS

| CN | 108923876 | 11/2020 |
| CN | 109905194 | 2/2021 |

(Continued)

OTHER PUBLICATIONS

Marsel Faizullin, et al., "Open-Source LiDAR Time Synchronization System by Mimicking GPS-clock," arXiv:2017.02625v1 [cs.RO] Jul. 6, 2021.

(Continued)

*Primary Examiner* — Keshab R Pandey
(74) *Attorney, Agent, or Firm* — McDonnell Boehnen Hulbert & Berghoff LLP

(57) ABSTRACT

A method and system to provide timebase synchronization for multiple processors in a multi-processor sensor system, where each processor operates according to a respective reference clock, and where the processors' respective reference clocks are off sync from each other. An example method includes simultaneously injecting a synchronization pulse respectively into the multiple processors. Further, the method includes recording for each processor, according to the processor's respective reference clock, a respective synchronization-pulse timestamp of the simultaneously injected synchronization pulse, comparing the respective synchronization-pulse timestamps recorded for the processors, and, based on the comparing, computing for each processor a respective time offset. Additionally, the method includes using the per-processor computed time offsets as a (Continued)

basis to provide a synchronized timebase across the processors.

20 Claims, 12 Drawing Sheets

(56) References Cited

U.S. PATENT DOCUMENTS

| | | | |
|---|---|---|---|
| 9,360,885 | B2 | 6/2016 | Ilyas et al. |
| 10,771,669 | B1 | 9/2020 | Balasubramanian et al. |
| 2007/0286195 | A1* | 12/2007 | Ilnickl .................... H04L 47/10 370/392 |
| 2020/0116559 | A1 | 4/2020 | Pacala et al. |
| 2021/0152269 | A1 | 5/2021 | Loinaz |
| 2021/0159995 | A1 | 5/2021 | Zhang et al. |

FOREIGN PATENT DOCUMENTS

| | | |
|---|---|---|
| CN | 109104259 | 5/2021 |
| CN | 113311905 | 8/2021 |
| WO | WO2020/199116 | 10/2020 |
| WO | WO2021/093346 | 5/2021 |

OTHER PUBLICATIONS

Shaoshan Liu, et al., "The Matter of Time—A General and Efficient System for Precise Sensor Synchronization in Robotic Computing," arXiv:2013.16045v1 [cs.RO] Mar. 30, 2021.

* cited by examiner

TIMEBASE SYNCHRONIZATION USING PULSED SIGNAL INJECTION

REFERENCE TO RELATED APPLICATION

This is a continuation of U.S. patent application Ser. No. 17/647,633, filed Jan. 11, 2022, the entirety of which is hereby incorporated by reference.

BACKGROUND

Unless otherwise indicated herein, the description in this section is not prior art to the claims in this application and is not admitted to be prior art by inclusion in this section.

Autonomous vehicles, semi-autonomous vehicles, vehicles operating in an autonomous mode, and/or vehicles operating in a semi-autonomous mode may use various sensors to detect their surroundings. For example, light detection and ranging (lidar) devices, radio detection and ranging (radar) devices, and/or cameras may be used to identify objects in environments surrounding autonomous or semi-autonomous vehicles. Such sensors may be used in object detection and avoidance and/or in navigation, for example.

SUMMARY

This disclosure relates to timebase synchronization of processors in a multi-processor sensing system.

A non-limiting example of such a system could include multiple sensors and one or more processors per sensor. In operation, the multiple sensors could operate cooperatively to sense a common object, even, or other item, with each sensor sensing the item and producing an associated sensor signal at a respective moment in time, and the processors could operate to generate associated per-sensor sensor data including, for each sensor a respective timestamp or other timing information related to the sensor's sensing operation. The system could then combine together this sensor data from the multiple sensors to produce composite sensor data that could facilitate useful action such as object detection and/or vehicle navigation as noted above for instance.

In this or other such arrangements, it could be desirable for the timestamps or other timing information generated by the processors to be defined according to a common timebase, in order to avoid skew errors in the composite sensor data. Unfortunately, however, a technical problem that could arise in practice is that the processors may operate with respective time clocks that are off sync from each other, so the processors would not generate their respective sensor timing information according to a common timebase, and the composite sensor data would therefore be in error. As an example of this, consider a scenario where the multiple sensors produce respective sensor signals at the exact same time as each other according to a universal time clock but where the processors generate associated timestamps of those sensor signals according to time clocks that are off sync from each other. In that situation, while the per-sensor timestamps should be the same as each other, they would be different than each other, and as a result the composite sensor data generated by the system would be incorrect.

Without limitation, this problem could arise in a multi-processor lidar system, where the sensors include lidar sensors configured to transmit light pulses at respective angles toward an object and to receive reflections of their respective transmitted light pulses off the object, with the time-of-flight of each light pulse (e.g., the round trip time, or half of the round trip time, between light-pulse transmission and return-light-pulse reception, etc.) representing a distance between the object and the sensor. In such a system, all of the lidar sensors could transmit their light pulses toward the object at the same moment in time as each other, and a processor per sensor could record a timestamp of the sensor's receipt of a respective return light pulse. The system could then use these per-sensor timestamps to determine distance per sensor and could compile these per-sensor distances and angle information to establish a point cloud representing the object and perhaps a location of the object in a surrounding environment. In this example scenario, however, if the processors operate with time clocks that are off sync from each other, the per-sensor timestamps will not have a common timebase, and the resulting point cloud will be incorrect.

Disclosed herein is a mechanism that may help to overcome this technical problem. In accordance with the disclosure, a computing system could simultaneously inject a synchronization pulse into the various processors of the multi-processor sensor system, each processor could record a synchronization-pulse timestamp of the injected synchronization pulse according to the processor's respective reference clock, the computing system could then compare the processors' recorded synchronization-pulse timestamps as a basis to establish a time offset respectively per processor, and the computing system could apply these computed time offsets to synchronize the processors' reference clocks or to correct sensor timestamps recorded by the processors (effectively synchronizing the processors' reference clocks).

In one aspect, for instance, disclosed is a method to provide timebase synchronization for multiple processors in a multi-processor sensor system. As disclosed, the method could involve simultaneously injecting a synchronization pulse into the multiple processors, where the multiple processors includes a first processor and a second processor, the first processor having a first reference clock, the second processor having a second reference clock, and the first and second reference clocks being off sync from each other. Further, the method could involve recording, according to the first reference clock of the first processor, a first timestamp of the simultaneously injected synchronization pulse, and recording, according to the second reference clock of the second processor, a second timestamp of the simultaneously injected synchronization pulse. Still further, the method could involve computing a time offset between the first timestamp recorded according to the first reference clock of the first processor and the second timestamp recorded according to the second reference clock of the second processor, and using the computed time offset as a basis to provide a synchronized timebase for time measurements thereafter made by the first and second processors.

In another aspect, disclosed is a multi-processor system, such as a multi-processor lidar system for instance. The system could include at least one application specific integrated circuit (ASIC) and could include multiple banks of digital signal processors (DSPs) respectively on each (of the at least one) ASIC, including at least a first bank of DSPs and a second bank of DSPs, with each bank including one or more DSPs. Further, the DSPs on each ASIC could be configured to compute times-of-flight of lidar return signals that are reflections of concurrently transmitted light pulses, with each DSP being configured to compute time-of-flight of a respective one of the lidar return signals. In an example implementation, the computed times-of-flight could map to point-cloud information for an object in a surrounding environment.

Still further, the system could include multiple clock sources that provide clock signals to the DSPs, including for each bank of DSPs a respective clock source that provides a respective clock signal to the one or more DSPs of the bank. Yet further, the clock signals as received by multiple such DSPs, including a first reference clock of a first one of the DSPs and a second reference clock of a second one of the DSPs, and the first reference clock and second reference clock and could be off sync from each other.

This system could then further include a timebase synchronization subsystem, which could include a synchronization-pulse injector and a computing module. The synchronization-pulse injector could be configured to simultaneously inject a synchronization pulse into the multiple DSPs, the first DSP could be configured to record, according to the first reference clock of the first DSP, a first timestamp of the simultaneously injected synchronization pulse, and the second DSP could be configured to record, according to the second reference clock of the second DSP, a second timestamp of the simultaneously injected synchronization pulse. Further, the computing module could be configured to compute a time offset between the first timestamp recorded according to the first reference clock of the first DSP and the second timestamp recorded according to the second reference clock of the second DSP and to use the computed time offset as a basis to provide a synchronized timebase for time measurements thereafter made by the first and second DSPs.

In addition, in yet another respect, disclosed is a non-transitory computer-readable medium having encoded thereon instructions executable to carry out operations for synchronizing timebase of multiple processors in a multi-processor sensor system. The operations could include determining synchronization-pulse timestamps upon simultaneous injection of a synchronization pulse into multiple processors, wherein the multiple processors includes a first processor and a second processor, the first processor having a first reference clock, the second processor having a second reference clock, and the first and second reference clocks being off sync from each other, and determining the timestamps could include determining a first timestamp of the simultaneously injected synchronization pulse according to the first reference clock of the first processor and determining a second timestamp of the simultaneously injected synchronization pulse according to the second reference clock of the second processor. Further, the operations could include computing a time offset between the first timestamp determined according to the first reference clock of the first processor and the second timestamp determined according to the second reference clock of the second processor, and using the computed time offset as a basis to provide a synchronized timebase for time measurements thereafter made by the first and second processors.

These as well as other aspects, advantages, and alternatives will become apparent to those of ordinary skill in the art by reading the following detailed description, with reference where appropriate to the accompanying drawings.

DETAILED DESCRIPTION

Figure 1:
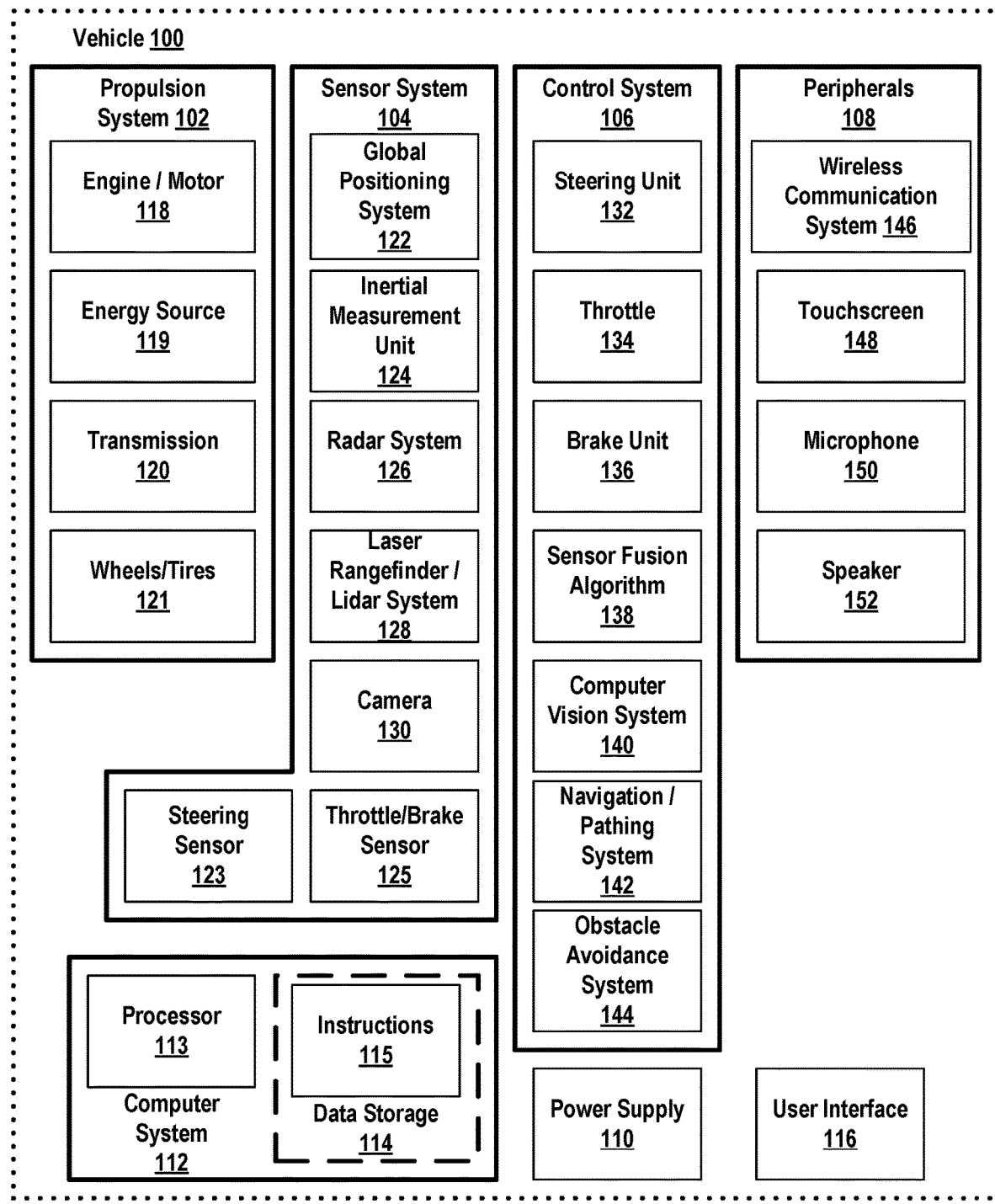
FIG. 1 is a functional block diagram illustrating a vehicle, according to example embodiments.
Figure 2A:
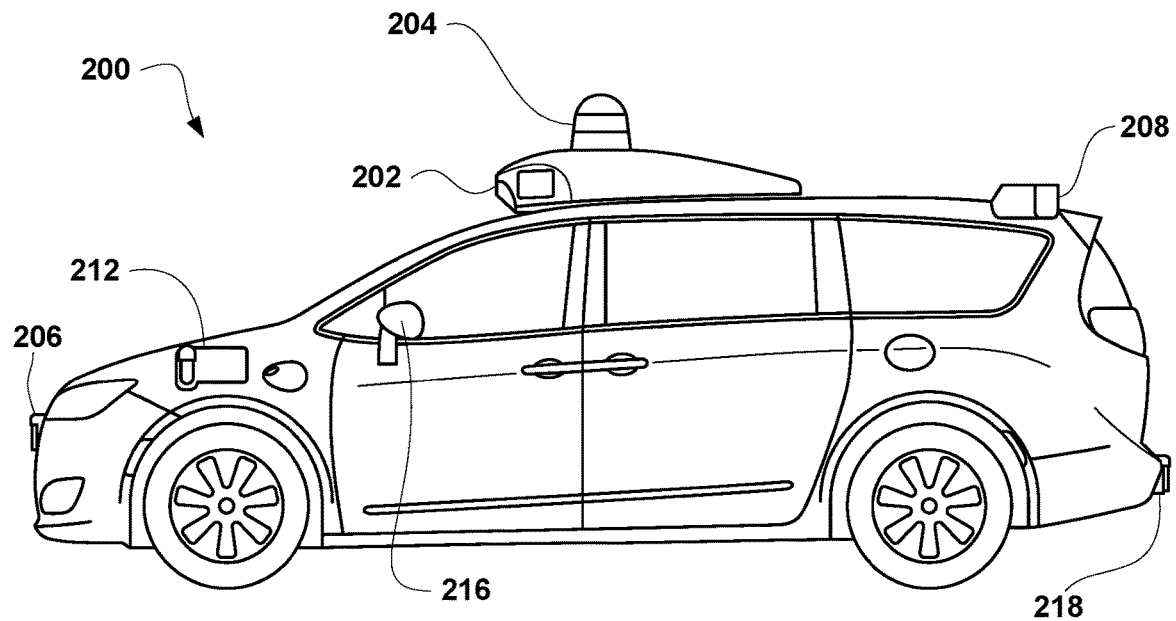
FIG. 2A is an illustration of a physical configuration of a vehicle, according to example embodiments.
Figure 2B:
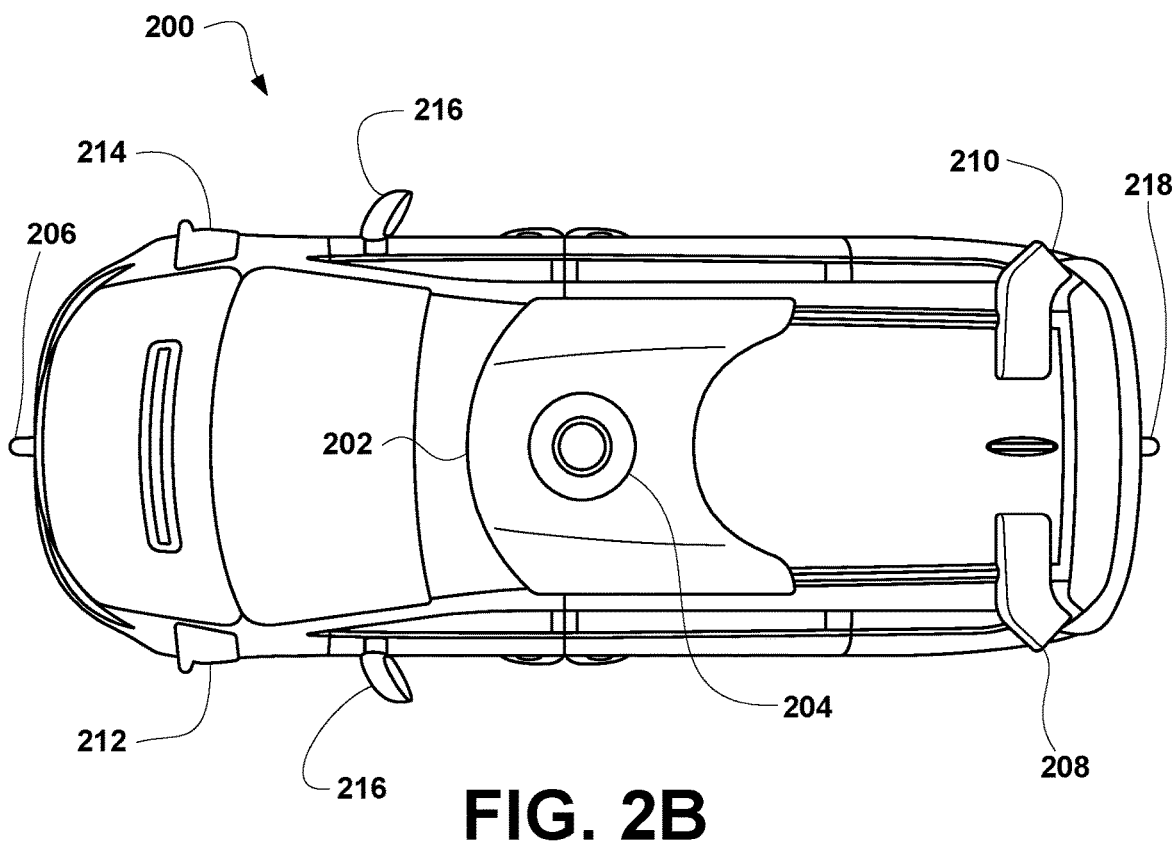
FIG. 2B is an illustration of a physical configuration of a vehicle, according to example embodiments.
Figure 2C:
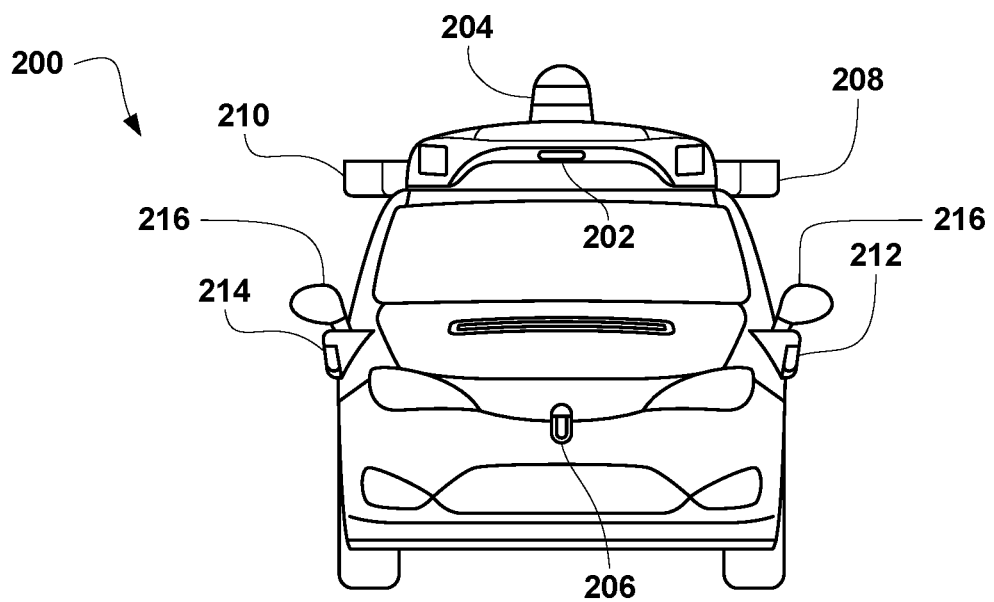
FIG. 2C is an illustration of a physical configuration of a vehicle, according to example embodiments.
Figure 2D:
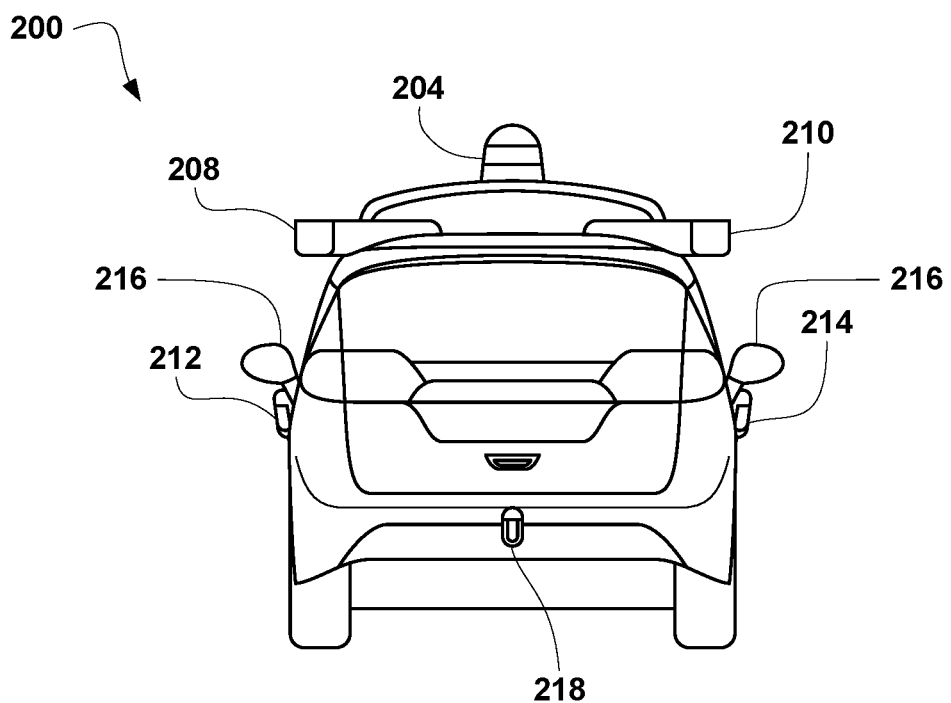
FIG. 2D is an illustration of a physical configuration of a vehicle, according to example embodiments.
Figure 2E:
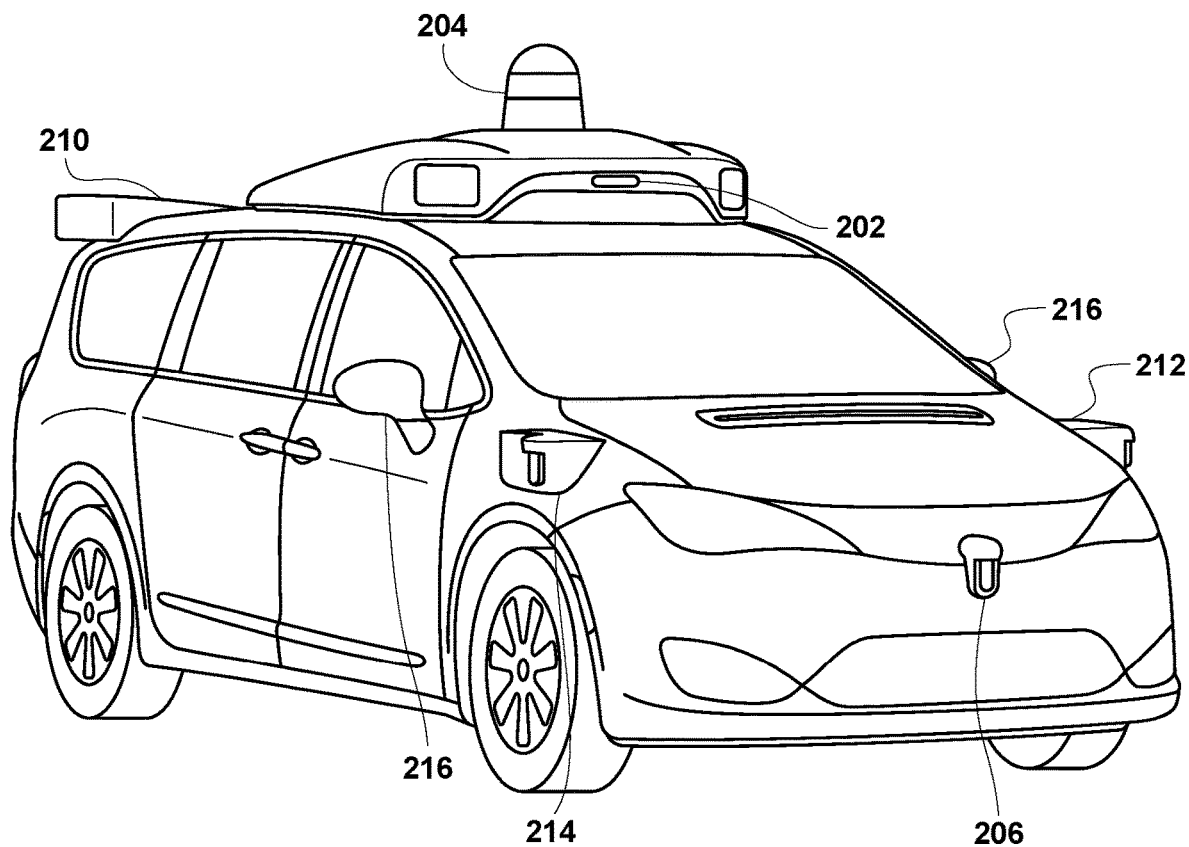
FIG. 2E is an illustration of a physical configuration of a vehicle, according to example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

Lidar devices as described herein can include one or more light emitters and one or more detectors used for detecting light that is emitted by the one or more light emitters and reflected by one or more objects in an environment surrounding the lidar device. As an example, the surrounding environment could include an interior or exterior environment, such as an inside of a building or an outside of a building. Additionally or alternatively, the surrounding environment could include an interior of a vehicle. Still further, the surrounding environment could include a vicinity around and/or on a roadway. Examples of objects in the surrounding environment include, but are not limited to, other vehicles, traffic signs, pedestrians, bicyclists, roadway surfaces, buildings, terrain, etc. Additionally, the one or more light emitters could emit light into a local environment of the lidar system itself. For example, light emitted from the one or more light emitters could interact with a housing of the lidar system and/or surfaces or structures coupled to the lidar system. In some cases, the lidar system could be mounted to a vehicle, in which case the one or more light emitters could be configured to emit light that interacts with objects within a vicinity of the vehicle. Further, the light emitters could include optical fiber amplifiers, laser diodes, light-emitting diodes (LEDs), among other possibilities.

In a representative lidar system as noted above, multiple processors could measure time-of-flight of light pulses (e.g., laser pulses, etc.) to facilitate generating point-cloud information representing the location and shape of an object in the surrounding environment. In particular, an example of such a lidar system could periodically fire many light pulses at once, and each of the processors could handle computing time-of-flight respectively for a given light pulse, with a central computing module then mapping each time-of-flight calculation to a respective point on the object. Further, such systems could concurrently emit the light pulses with different directions than each in a particular pattern (such as a vertical line), to facilitate mapping to points along that pattern on the object. In addition, the system could rotate and repeat the process to map to further instances of the pattern on the object, in order to produce a complete point cloud representing the object.

But in such a lidar system, the various processors may operate according to reference clocks that are off sync from each other. This lack of synchronization could arise in various ways. For example, various groups of the processors could receive respective clock signals that are all at the same frequency as each other but are off phase from each other enough to make the clock signals substantively off sync. Further, as another example, if the processors are provided on an integrated circuit (e.g., an ASIC, a field programmable gate array (FPGA), a microprocessor, a central processing unit (CPU), a graphics processing unit (GPU), a tensor processing unit (TPU), a microcontroller, etc.), there could be differences in delay of trace routing for conveying a common clock signal to the various processors, which could create differences in reference time among the processors.

As indicated above, this timing synchronization problem can be significant for lidar. In practice, for instance, when the system concurrently fires multiple light pulses (e.g., laser pulses, etc.) toward an object, the system could use one of the processors' (or processor groups') reference clocks to establish a single transmit timestamp of those light pulses, and the system could provide that transmit timestamp value to each processor. Because the various processors' reference clocks are off sync from each other, though, this transmit timestamp value would represent a different point in universal time per processor. In turn, each processor could then receive a reflected return light pulse respectively for a given one of the transmitted light pulses and could record a receive timestamp for that return light pulse, also according to the processor's reference clock. Further, each processor could compute a time-of-flight for that respective light pulse as the difference between the transmit timestamp and the receive timestamp. However, because the processors' reference clocks are off sync from other, these time-of-flight measurements would be skewed in relation to each other.

To appreciate this problem, expanding on the example discussed above, consider a scenario where all points on the object at issue are equidistant from the respective lidar pulse emitters. In this scenario, because all of the light pulses are transmitted concurrently, all of the reflected return light pulses should be received concurrently, and so the calculated times-of-flight should be the same for all of the light pulses. However, in practice, while the processors in this scenario would all have the same transmit timestamp as each other, and while the return light pulses would all be received concurrently, the processors would register different receive timestamps than each other because their reference clocks would read different values upon their concurrent reception of the reflected return light pulses. As a result, the times-of-flight would be different for the various light pulses. Therefore, the associated point-cloud established based on those times-of-flight would be incorrect.

As noted above, the present disclosure provides a mechanism that may help to overcome this problem. In particular, as indicated above, a computing system could synchronously inject a synchronization pulse (e.g. an electrical signal, etc.) into the various processors of the multi-processor sensor system, each processor could record a synchronization-pulse timestamp of the injected synchronization pulse according to the processor's reference clock, the computing system could compare the processors' recorded synchronization-pulse timestamps as a basis to establish a time offset respectively per processor, and the computing system could apply these computed time offsets to synchronize the processors' reference clocks or to correct sensor timestamps recorded by the processors (effectively synchronizing the processors' reference clocks).

By way of example, in a scenario where the various processors are provided on at least one ASIC, an external microcontroller unit (MCU) could provide a synchronization pulse signal to a general purpose input/output (GPIO) pin as a trigger to inject a corresponding synchronization pulse signal concurrently into each processor of the system. Each processor could then measure the timestamp of this simultaneously-injected synchronization-pulse signal according to the processor's respective reference clock and could report this synchronization-pulse timestamp to a central computing module (e.g., a graphics processing unit (GPU), a central processing unit (CPU), a tensor processing unit (TPU), a field programmable gate array (FPGA), etc.) Given each processors' respective synchronization-pulse timestamp, the computing module could then compute a respective time offset per processor. For instance, the computing module could deem one of the processors' synchronization-pulse timestamps to be a reference timestamp and could compute for each processor (e.g., each other processor, etc.) a respective time offset as the difference between the processor's synchronization-pulse timestamp and that reference timestamp. Alternatively, the computing module could use another reference timestamp, such as a predefined timestamp or a timestamp of the MCU output or GPIO input for example, as a basis to compute these per-processor time offsets.

The computing module could then cause the respective time offset computed per processor to be applied in order to adjust the processor's reference clock or to adjust one or more sensor timestamps or associated timing measures that the processor determines in practice. For instance, the computing module could responsively provision each processor with the time offset computed respectively for the processor, and each processor could be configured to apply its respectively provisioned time offset to correct its processor clock (e.g., to shift the phase of the processor's clock signal, etc.), so that the processors' clocks would become synchronized and the lidar receive timestamps then determined by the processors would have a common timebase (e.g., would be based on clock signals that are in phase with each other, etc.) Alternatively, the computing system could likewise provision each processor with the time offset computed for the respective processor, and each processor could be configured to apply its respectively provisioned time offset to adjust its determined lidar receive timestamps, so that the lidar receive timestamps determined by the processors would effectively have a common timebase. Still alternatively, the computing module could record the time offset respectively per processor, and the computing module could be configured to use the recorded time offset per processor as a basis to adjust each time-of-flight value computed and reported by the processor, so that those time-of-flight values would effectively have a common timebase.

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks, motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, robot devices, etc. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, example vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles, etc.) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), emergency braking, etc.), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway, etc.) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion, etc.) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118, etc.). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/lidar 128, camera 130, steering sensor 123, and throttle/brake sensor 125, among other possible sensors. In some embodiments, sensor system 104 may also include sensors configured to monitor internal systems of the vehicle 100 (e.g., 02 monitor, fuel gauge, engine oil temperature, brake wear, etc.).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/lidar 128 may include one or more laser sources, a laser scanner, and one or more detectors, among other system components, and may operate in a coherent mode (e.g., using heterodyne detection, etc.) or in an incoherent detection mode (i.e., time-of-flight mode). In some embodiments, the one or more detectors of the laser rangefinder/lidar 128 may include one or more photodetectors, which may be especially sensitive detectors (e.g., avalanche photodiodes, etc.). In some examples, such photodetectors may be capable of detecting single photons (e.g., single-photon avalanche diodes (SPADs), etc.). Further, such photodetectors can be arranged (e.g., through an electrical connection in series, etc.) into an array (e.g., as in a silicon photomultiplier (SiPM), etc.). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, a night vision camera, etc.) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve, a carburetor, etc.). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor, an application-specific integrated circuit (ASIC), a volatile memory, a non-volatile memory, one or more machine-learned models, etc.) operable to process and analyze images in an effort to determine objects that are in motion (e.g., other vehicles, pedestrians, bicyclists, animals, etc.) and objects that are not in motion (e.g., traffic lights, roadway boundaries, speedbumps, potholes, etc.). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic, etc.) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, control system 106, etc.), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or laser rangefinder/lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E shows an example vehicle 200 (e.g., a fully autonomous vehicle or semi-autonomous vehicle, etc.) that can include some or all of the functions described in connection with vehicle 100 in reference to FIG. 1. Although vehicle 200 is illustrated in FIGS. 2A-2E as a van with side view mirrors 216 for illustrative purposes, the present disclosure is not so limited. For instance, the vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices, etc.).

The example vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras, etc.), one or more lidars, one or more radars, one or more range finders, one or more inertial sensors, one or more humidity sensors, one or more acoustic sensors (e.g., microphones, sonar devices, etc.), or one or more other sensors configured to sense information about an environment surrounding the vehicle 200. In other words, any sensor system now known or later created could be coupled to the vehicle 200 and/or could be utilized in conjunction with various operations of the vehicle 200. As an example, a lidar system could be utilized in self-driving or other types of navigation, planning, perception, and/or mapping operations of the vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; one or more lidars, cameras, and radars; etc.).

Note that the number, location, and type of sensor systems (e.g., 202, 204, etc.) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, to adapt to specialized environmental or application circumstances, etc.). For example, the sensor systems (e.g., 202, 204, etc.) could be disposed in various other locations on the vehicle (e.g., at location 216, etc.) and could have fields of view that correspond to internal and/or surrounding environments of the vehicle 200.

The sensor system 202 may be mounted atop the vehicle 200 and may include one or more sensors configured to detect information about an environment surrounding the vehicle 200, and output indications of the information. For example, sensor system 202 can include any combination of cameras, radars, lidars, range finders, inertial sensors, humidity sensors, and acoustic sensors (e.g., microphones, sonar devices, etc.). The sensor system 202 can include one or more movable mounts that could be operable to adjust the orientation of one or more sensors in the sensor system 202. In one embodiment, the movable mount could include a rotating platform that could scan sensors so as to obtain information from each direction around the vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of the sensor locations 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar sensors. For example, the lidar sensors could include a plurality of light-emitter devices arranged over a range of angles with respect to a given plane (e.g., the x-y plane, etc.). For example, one or more of the sensor systems 202, 204, 206, 208, 210, 212, 214, and/or 218 may be configured to rotate or pivot about an axis (e.g., the z-axis, etc.) perpendicular to the given plane so as to illuminate an environment surrounding the vehicle 200 with light pulses. Based on detecting various aspects of reflected light pulses (e.g., the elapsed time-of-flight, polarization, intensity, etc.), information about the surrounding environment may be determined.

In an example embodiment, sensor systems 202, 204, 206, 208, 210, 212, 214, and/or 218 may be configured to provide respective point cloud information that may relate to physical objects within the surrounding environment of the vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, the example vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz, etc.). Such radio waves may be used to determine the distance to and/or velocity of one or more objects in the surrounding environment of the vehicle 200. For example, one or more sensor systems 202, 204, 206, 208, 210, 212, 214, and/or 218 could include one or more radars. In some examples, one or more radars can be located near the rear of the vehicle 200 (e.g., sensor systems 208, 210, etc.), to actively scan the environment near the back of the vehicle 200 for the presence of radio-reflective objects. Similarly, one or more radars can be located near the front of the vehicle 200 (e.g., sensor systems 212, 214, etc.) to actively scan the environment near the front of the vehicle 200. A radar can be situated, for example, in a location suitable to illuminate a region including a forward-moving path of the vehicle 200 without occlusion by other features of the vehicle 200. For example, a radar can be embedded in and/or mounted in or near the front bumper, front headlights, cowl, and/or hood, etc. Furthermore, one or more additional radars can be located to actively scan the side and/or rear of the vehicle 200 for the presence of radio-reflective objects, such as by including such devices in or near the rear bumper, side panels, rocker panels, and/or undercarriage, etc.

The vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which the vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may also include one or more acoustic sensors (e.g., one or more of the sensor systems 202, 204, 206, 208, 210, 212, 214, 216, 218 may include one or more acoustic sensors, etc.) used to sense a surrounding environment of vehicle 200. Acoustic sensors may include microphones (e.g., piezoelectric microphones, condenser microphones, ribbon microphones, microelectromechanical systems (MEMS) microphones, etc.) used to sense acoustic waves (i.e., pressure differentials) in a fluid (e.g., air, etc.) of the environment surrounding the vehicle 200. Such acoustic sensors may be used to identify sounds in the surrounding environment (e.g., sirens, human speech, animal sounds, alarms, etc.) upon which control strategy for vehicle 200 may be based. For example, if the acoustic sensor detects a siren (e.g., an ambulatory siren, a fire engine siren, etc.), vehicle 200 may slow down and/or navigate to the edge of a roadway.

Although not shown in FIGS. 2A-2E, the vehicle 200 can include a wireless communication system (e.g., similar to the wireless communication system 146 of FIG. 1 and/or in addition to the wireless communication system 146 of FIG. 1, etc.). The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 3:
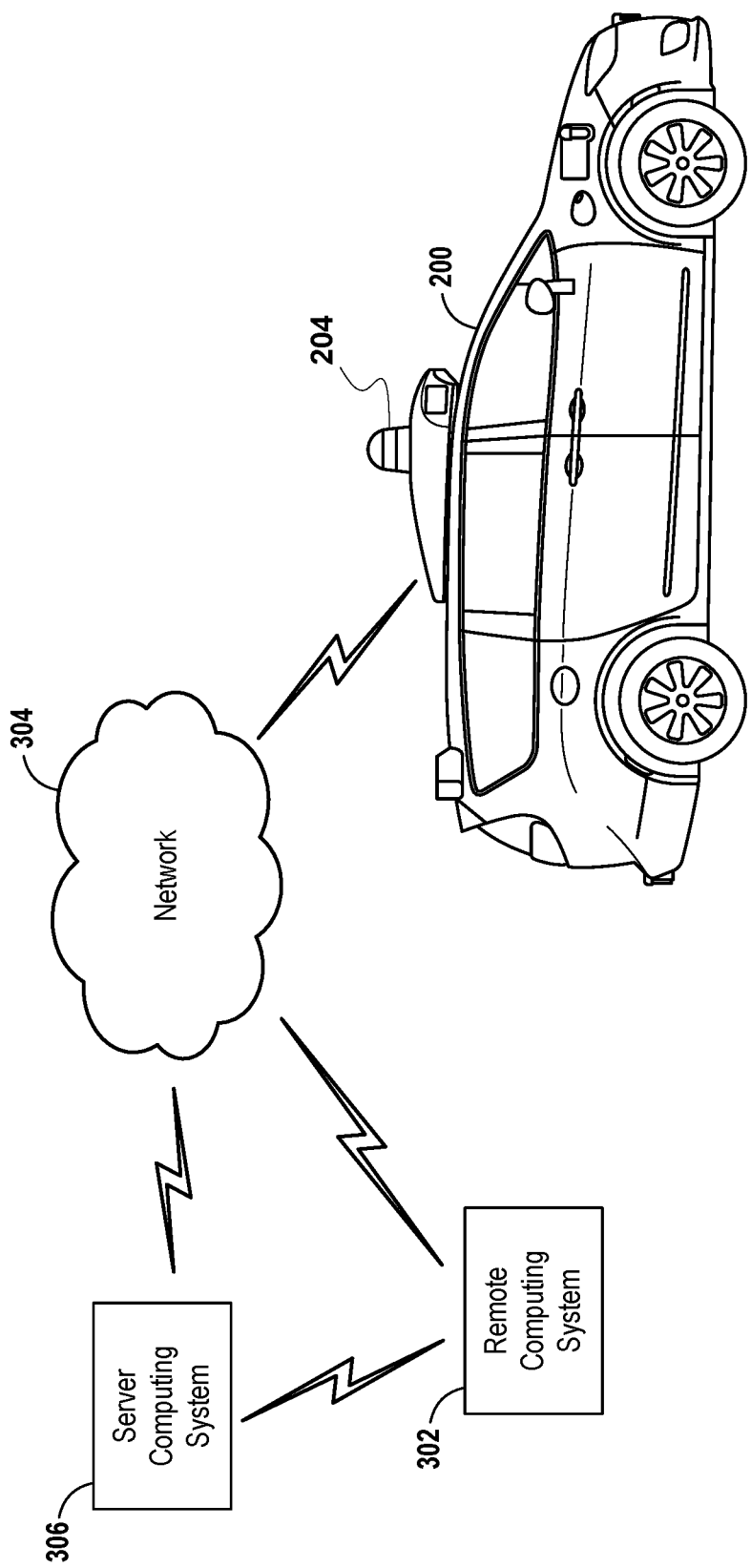
FIG. 3 is a conceptual illustration of wireless communication between various computing systems related to an autonomous or semi-autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone, etc.), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, a computing system local to vehicle 200, etc.) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200, etc.) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distances to and positions of various reflecting objects may be determined. In some embodiments, the vehicle may have more than one radar in different orientations. The radar system may be configured to store captured information to a memory for later processing by a processing system of the vehicle. The information captured by the radar system may be environment data.

In another example, a laser range finder may be configured to transmit an electromagnetic signal (e.g., infrared light, such as that from a gas or diode laser, or other possible light source) that will be reflected by target objects near the vehicle. The laser range finder may be able to capture the reflected electromagnetic (e.g., infrared light, etc.) signals. The captured reflected electromagnetic signals may enable the range-finding system (or processing system) to determine a range to various objects. The laser range finder may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals, etc.), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present, etc.), (ii) confirm whether the vehicle's identification of the object is correct, (iii) correct the identification if the identification was incorrect and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign, etc.), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar unit. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304, etc.), and in some embodiments, via a server (e.g., server computing system 306, etc.). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction, etc.), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign, etc.), but may be configured to request remote assistance at the same time as (or at a later time from) when the vehicle operates in accordance with the detected object.

Figure 4A:
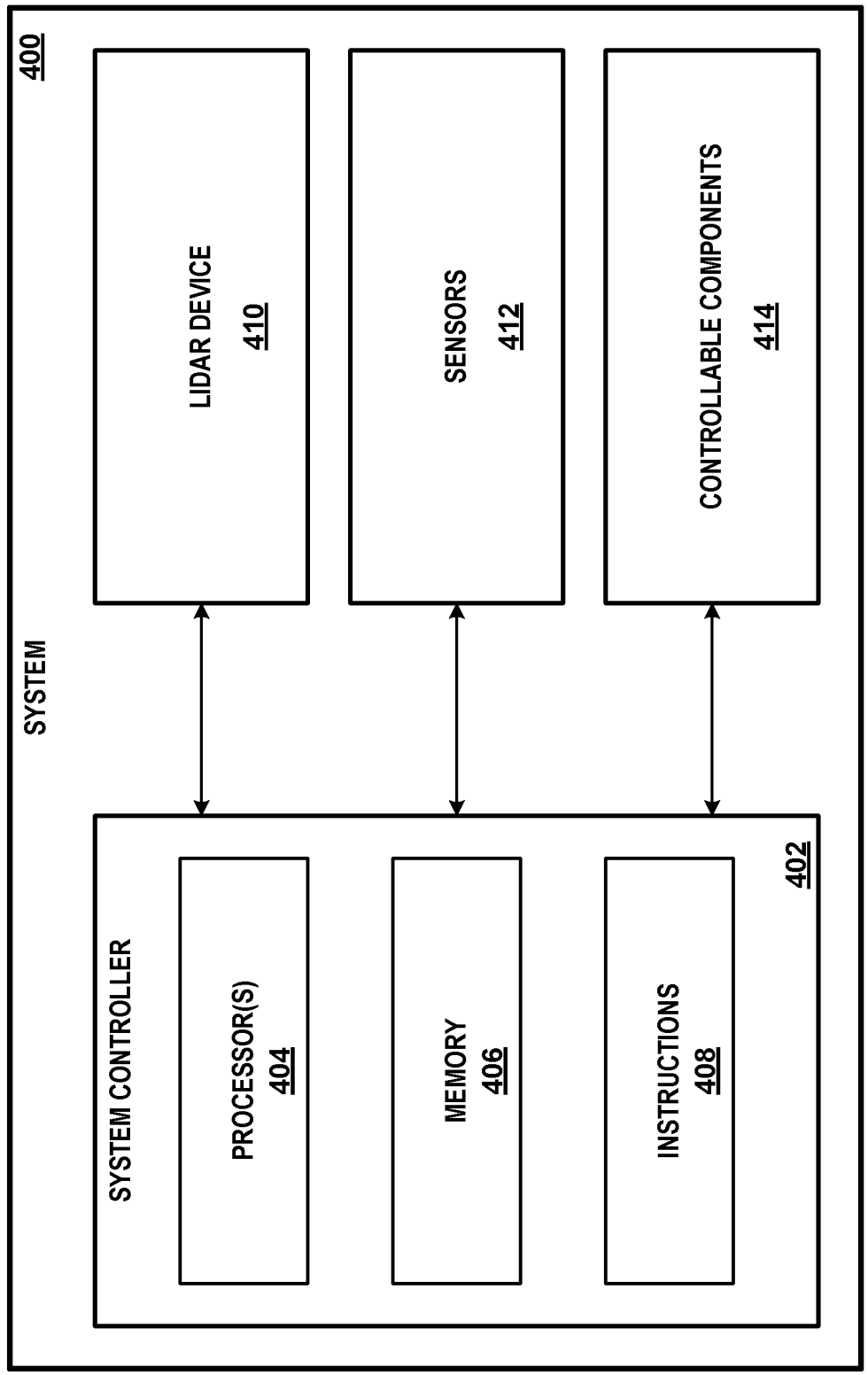
FIG. 4A is a block diagram of a system including a lidar device, according to example embodiments.

FIG. 4A is a block diagram of a system, according to example embodiments. In particular, FIG. 4A shows a system 400 that includes a system controller 402, a lidar device 410, a plurality of sensors 412, and a plurality of controllable components 414. System controller 402 includes processor(s) 404, a memory 406, and instructions 408 stored on the memory 406 and executable by the processor(s) 404 to perform functions.

The processor(s) 404 can include one or more processors, such as one or more general-purpose microprocessors (e.g., having a single core or multiple cores, etc.) and/or one or more special purpose microprocessors. The one or more processors may include, for instance, one or more central processing units (CPUs), one or more microcontrollers, one or more graphical processing units (GPUs), one or more tensor processing units (TPUs), one or more ASICs, and/or one or more field-programmable gate arrays (FPGAs). Other types of processors, computers, or devices configured to carry out software instructions are also contemplated herein.

The memory 406 may include a computer-readable medium, such as a non-transitory, computer-readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory, etc.), a solid state drive (SSD), a hard disk drive (HDD), a Compact Disc (CD), a Digital Video Disk (DVD), a digital tape, read/write (RAY) CDs, RAY DVDs, etc.

The lidar device 410, described further below, includes a plurality of light emitters configured to emit light (e.g., in light pulses, etc.) and one or more light detectors configured to detect light (e.g., reflected portions of the light pulses, etc.). The lidar device 410 may generate three-dimensional (3D) point cloud data from outputs of the light detector(s), and provide the 3D point cloud data to the system controller 402. The system controller 402, in turn, may perform operations on the 3D point cloud data to determine the characteristics of a surrounding environment (e.g., relative positions of objects within a surrounding environment, edge detection, object detection, proximity sensing, etc.).

Similarly, the system controller 402 may use outputs from the plurality of sensors 412 to determine the characteristics of the system 400 and/or characteristics of the surrounding environment. For example, the sensors 412 may include one or more of a GPS, an IMU, an image capture device (e.g., a camera, etc.), a light sensor, a heat sensor, and other sensors indicative of parameters relevant to the system 400 and/or the surrounding environment. The lidar device 410 is depicted as separate from the sensors 412 for purposes of example, and may be considered as part of or as the sensors 412 in some examples.

Based on characteristics of the system 400 and/or the surrounding environment determined by the system controller 402 based on the outputs from the lidar device 410 and the sensors 412, the system controller 402 may control the controllable components 414 to perform one or more actions. For example, the system 400 may correspond to a vehicle, in which case the controllable components 414 may include a braking system, a turning system, and/or an accelerating system of the vehicle, and the system controller 402 may change aspects of these controllable components based on characteristics determined from the lidar device 410 and/or sensors 412 (e.g., when the system controller 402 controls the vehicle in an autonomous or semi-autonomous mode, etc.). Within examples, the lidar device 410 and the sensors 412 are also controllable by the system controller 402.

Figure 4B:
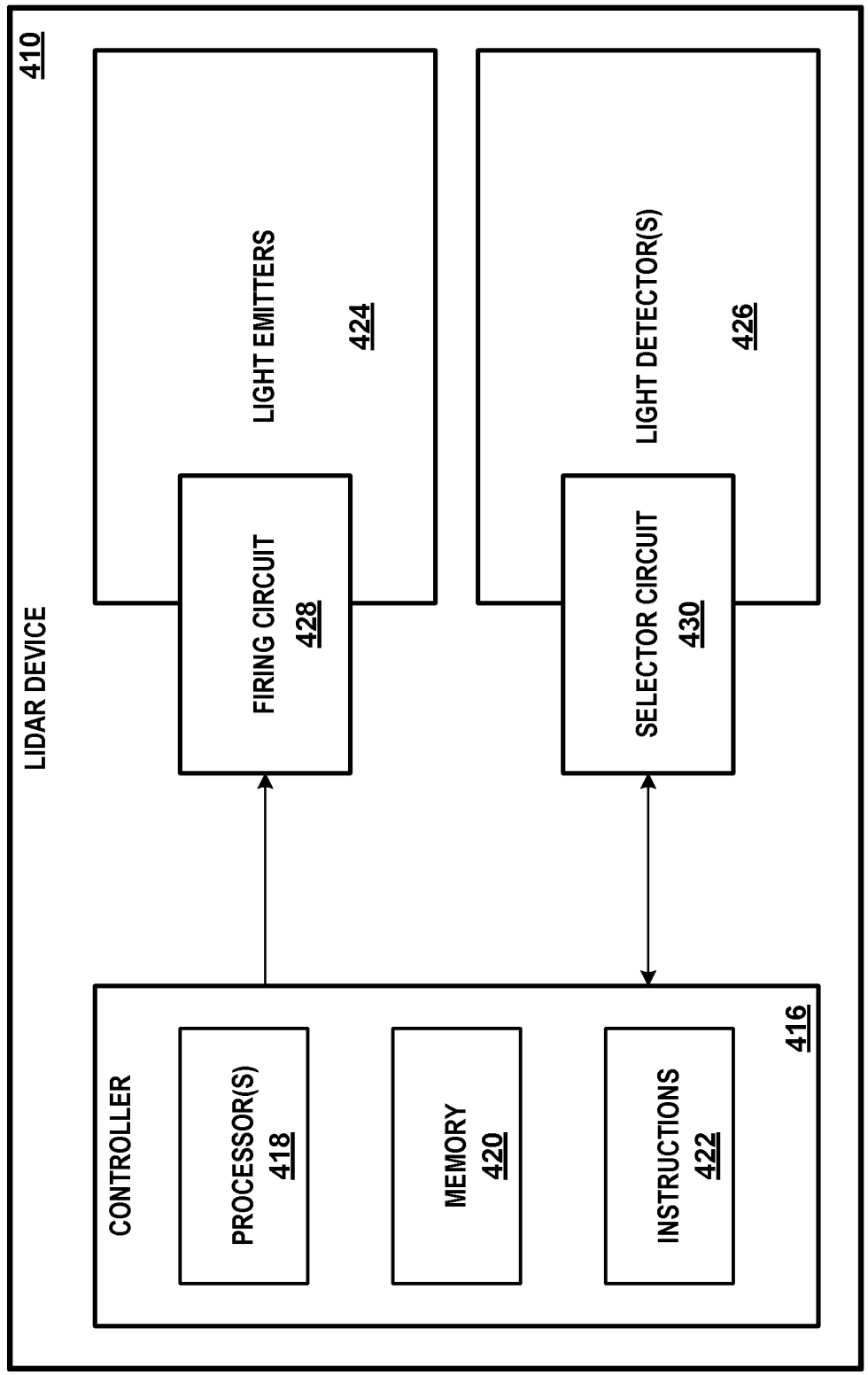
FIG. 4B is a block diagram of a lidar device, according to example embodiments.

FIG. 4B is a block diagram of a lidar device, according to an example embodiment. In particular, FIG. 4B shows a lidar device 410, having a controller 416 configured to control a plurality of light emitters 424 and one or more light detector(s), e.g., a plurality of light detectors 426, etc. The lidar device 410 further includes a firing circuit 428 configured to select and provide power to respective light emitters of the plurality of light emitters 424 and may include a selector circuit 430 configured to select respective light detectors of the plurality of light detectors 426. The controller 416 includes processor(s) 418, a memory 420, and instructions 422 stored on the memory 420.

Similar to processor(s) 404, the processor(s) 418 can include one or more processors, such as one or more general-purpose microprocessors and/or one or more special purpose microprocessors. The one or more processors may include, for instance, one or more CPUs, one or more microcontrollers, one or more GPUs, one or more TPUs, one or more ASICs, and/or one or more FPGAs. Other types of processors, computers, or devices configured to carry out software instructions are also contemplated herein.

Similar to memory 406, the memory 420 may include a computer-readable medium, such as a non-transitory, computer-readable medium, such as, but not limited to, ROM, PROM, EPROM, EEPROM, non-volatile random-access memory (e.g., flash memory, etc.), a SSD, a HDD, a CD, a DVD, a digital tape, R/W CDs, R/W DVDs, etc.

The instructions 422 are stored on memory 420 and executable by the processor(s) 418 to perform functions related to controlling the firing circuit 428 and the selector circuit 430, for generating 3D point cloud data, and for processing the 3D point cloud data (or perhaps facilitating processing the 3D point cloud data by another computing device, such as the system controller 402).

The controller 416 can determine 3D point cloud data by using the light emitters 424 to emit pulses of light. A time of emission is established for each light emitter and a relative location at the time of emission is also tracked. Aspects of a surrounding environment of the lidar device 410, such as various objects, reflect the pulses of light. For example, when the lidar device 410 is in a surrounding environment that includes a road, such objects may include vehicles, signs, pedestrians, road surfaces, construction cones, or the like. Some objects may be more reflective than others, such that an intensity of reflected light may indicate a type of object that reflects the light pulses. Further, surfaces of objects may be at different positions relative to the lidar device 410, and thus take more or less time to reflect portions of light pulses back to the lidar device 410. Accordingly, the controller 416 may track a detection time at which a reflected light pulse is detected by a light detector and a relative position of the light detector at the detection time. By measuring time differences between emission times and detection times, the controller 416 can determine how far the light pulses travel prior to being received, and thus a relative distance of a corresponding object. By tracking relative positions at the emission times and detection times the controller 416 can determine an orientation of the light pulse and reflected light pulse relative to the lidar device 410, and thus a relative orientation of the object. By tracking intensities of received light pulses, the controller 416 can determine how reflective the object is. The 3D point cloud data determined based on this information may thus indicate relative positions of detected reflected light pulses (e.g., within a coordinate system, such as a Cartesian coordinate system, etc.) and intensities of each reflected light pulse.

The firing circuit 428 is used for selecting light emitters for emitting light pulses. The selector circuit 430 similarly is used for sampling outputs from light detectors.

Figure 5A:
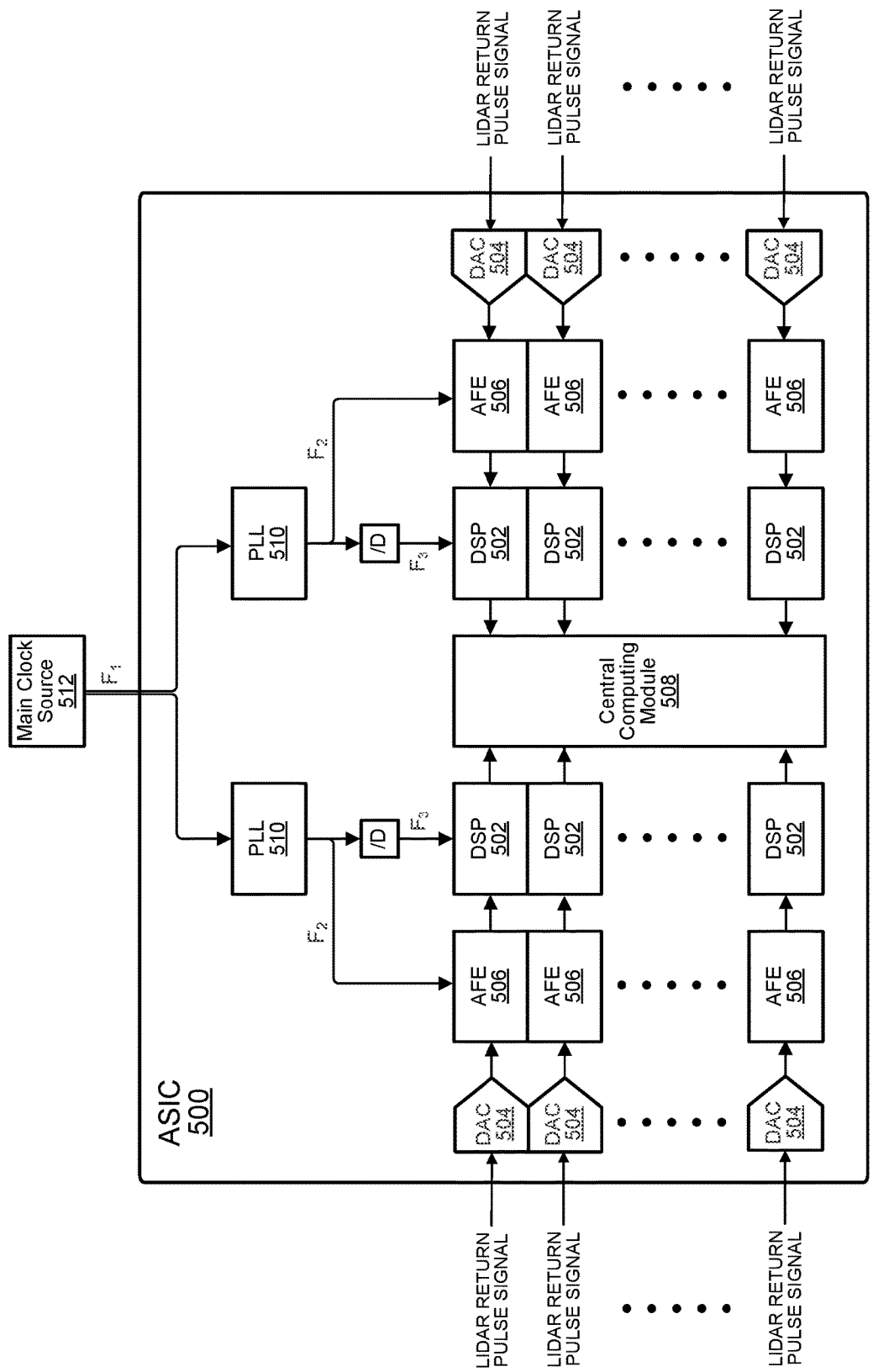
FIG. 5A is a block diagram of an ASIC, according to example embodiments.

In an example implementation, as noted above, controller 416 could include one or more ASICs each configured to process data related to multiple lidar pulse emissions and associated lidar return pulses, so as to facilitate or help facilitate generation of a 3D point cloud. FIG. 5A is a simplified diagram of such ASIC 500, though it will be understood that variations from the arrangement illustrated are possible.

An ASIC is an integrated circuit chip customized for a particular use rather than intended for general purpose use. Modern ASICs, also referred to as a system-on-a-chip (SOC), may include entire microprocessors, memory blocks (e.g., read-only memory (ROM), random-access memory (RAM), electrically erasable programmable read only memory (EEPROM), flash memory, etc.), and various other building blocks. ASIC design and manufacture could include development of system specifications, mapping of functional system blocks to a gate level netlist, converting the gate level netlist to a 2D and/or 3D physical geometric representation, and fabricating and interconnecting silicon layers corresponding with the geometric representation, among other possibilities.

As shown in FIG. 5A, the example ASIC 500 includes multiple digital signal processors (DSPs) 502, an associated digital-to-analog converter (DAC) 504 and analog front end (AFE) 506 respectively per DSP, and a central computing module 508 having a communication link with each DSP 502. With this arrangement, the lidar device could fire multiple light pulses simultaneously from light emitters 424, each toward a different respective point on an object in the surrounding environment, and each DSP 502 could determine timing information for a reflection of a respective one of those light pulses as a respective lidar return pulse and could report that timing information to the central computing module for processing. The central computing module 508 could then use that timing information as a basis to facilitate generating the 3D point cloud or a portion of the 3D point cloud.

For instance, each DSP's respective DAC 504 could have a signaling connection with a respective light detector 426 such as a silicon photomultiplier (SiPM) or avalanche photodiode (APD). Upon firing of the multiple light pulses, each such light detector could then detect a respective lidar return pulse and output to a respective DAC 504 an associated digital signal representing detection of the lidar return pulse, which the DAC 504 could then convert to analog form and output to its associated AFE 506. Each AFE 506 could thus receive an analog signal representing detection of a respective such lidar return pulse by a light detector 426 and could convert that analog signal to a digital signal for processing by its associated DSP 502. The associated DSP could then determine and report to the central computing module 508 data representing a detection timestamp (or receive timestamp) of the lidar return pulse, such as a clock time when the digital signal received from its AFE 506 transitions from 0 to 1. In addition, at the time the lidar device fires the multiple light pulses simultaneously, the various DSPs and/or the central computing module could also be provisioned with data representing an emission timestamp of the simultaneously fired light pulses. For each lidar return pulse, the respective DSP 502 or the central computing module 508 could then calculate a respective time-of-flight as the difference between the emission timestamp and the associated detection timestamp.

In the example arrangement shown in FIG. 5A, the multiple DSPs 502 are grouped into two banks each including a respective group of DSPs 502 and thus a respective group of processing channels. In practice, the ASIC 500 could include anywhere from two to hundreds of channels. For example, the ASIC 500 could include 4, 8, 16, 32, or another number of channels. Further, the DSPs 502 could be grouped and/or otherwise arranged in a different manner.

To facilitate determining return timestamps of the various lidar return pulses, each of the DSPs 502 could have a respective reference clock. As shown in FIG. 5A, for instance, the ASIC 500 could include for each bank of DSPs 502 a respective phase locked loop (PLL) 510 that provides a clock signal to the DSPs 502 of the bank. Both PLLs 510 could receive a common clock reference signal of frequency $F_1$ (e.g., 10 MHz, 50 MHz, 100 MHz, etc.) from an off-chip main clock source 512, and, based on that reference signal, each PLL 510 could generate and divide down a clock signal of frequency $F_2$ (e.g., 1 GHz, 2.5 GHz, 5 GHz, etc.) by a ratio of $F_2/D$ (e.g., $F_2/3$, $F_2/4$, $F_2/5$, $2F_2/7$, etc.) to produce a clock signal of frequency $F_3=F_2/D$ that flows to each DSP 502 of the respective bank. Receiving this $F_3$ clock signal and using the $F_3$ clock signal to track the passage of time, each DSP 502 could thereby determine and record a detection timestamp for a respective lidar return pulse.

As noted above, however, a problem with this or another such arrangement is that the reference clocks of the various DSPs 502 may be off sync from each other. One reason for this lack of synchronization could be that the $F_3$ clock signals provided to the respective banks of DSPs 502 could be off phase from each other, so that whatever point on the signal waveform is used as a clock tick would occur first on one bank's $F_3$ clock signal and then on the other bank's $F_3$ clock signal. This could be a result of a non-deterministic startup process of each PLL 510, such that the phase relationship of the PLLs' resulting $F_3$ clock signals may vary randomly on every power cycle of the system. Another reason for the lack of synchronization could be differences in delay of trace routing for conveying these clock signals to the various DSPs 502 (such as differences in length and/or layout of lines running to the various DSPs 502, differences in parasitic capacitances and inductances along respective lines, etc.), which could also create differences in reference time between the various DSPs 502.

Figure 5B:
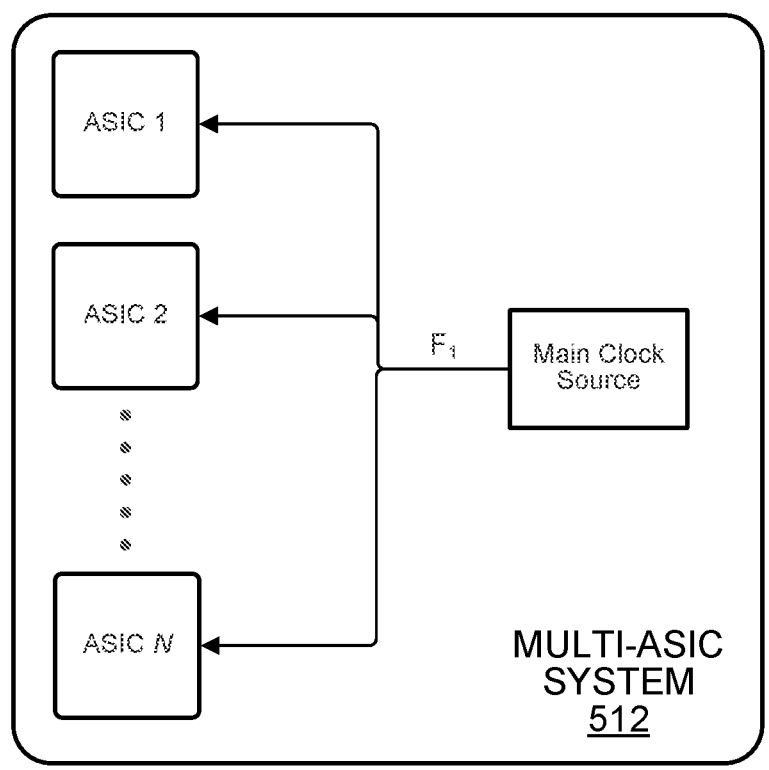
FIG. 5B is a block diagram of a multi-ASIC system, according to example embodiments.

A representative system could also include multiple ASICs such as those shown in FIG. 5A, which could work in concert to establish a dense 3D point cloud based on lidar measurements. FIG. 5B illustrates such a multi-ASIC system 512. In particular, as shown in FIG. 5B, the multi-ASIC system could include N such ASICs, for example 5, 10, 20, or another number of such ASICS, each arranged as in FIG. 5A among other possibilities, and each fed by the same off-chip $F_1$ main clock source as each other. These multiple ASICs and main clock source could be provided on a common printed circuit board (PCB), or on multiple PCBs, a flip chip, or a multicore with an ASIC representing a single core, among other possibilities. With this arrangement, the system could fire many multiples of the above-noted lidar light pulses at once and could compute and process time-of-flight information for all of the associated lidar return pulses to establish improved 3D point-cloud data. However, each ASIC in this arrangement could suffer from the clock synchronization problem noted above. Further, there could be additional trace routing or other signal delay differences in feeding the $F_1$ main clock signal to the various ASICs, which could cause additional difference in the DSP reference time between the various ASICs.

As noted above, the present disclosure provides a mechanism that could help to synchronize the timebase of the DSPs 502 in such a multi-processor sensor system. In particular, in line with the discussion above, the disclosed mechanism could involve simultaneously injecting a synchronization pulse into the various DSPs 502 of an ASIC 500 or of multiple such ASICs, having each DSP 502 record a synchronization-pulse timestamp of the injected synchronization pulse according to the DSP's respective reference clock, and then comparing the DSPs' recorded synchronization-pulse timestamps as a basis to establish a time offset respectively per DSP 502 and applying the established time offsets to synchronize the DSPs' reference clocks or to adjust the detection timestamps recorded by the DSPs (effectively synchronizing the DSPs' reference clocks).

As further indicated above, one way to simultaneously inject such a synchronization pulse to the various DSPs 502 on a given such ASIC 500 or on multiple ASICs is to feed the synchronization-pulse signal from an external MCU (or from another source, for example, a dedicated pulse generator, among other possibilities) into a general purpose input/output (GPIO) pin of the ASIC 500 or into GPIO pins of the multiple ASICs, and to configure the ASIC(s) 500 to pass that synchronization-pulse signal simultaneously to the various DSPs 502, i.e., to be received as simultaneously as practical by the various DSPs 502 on the ASIC(s) 500.

Figure 6:
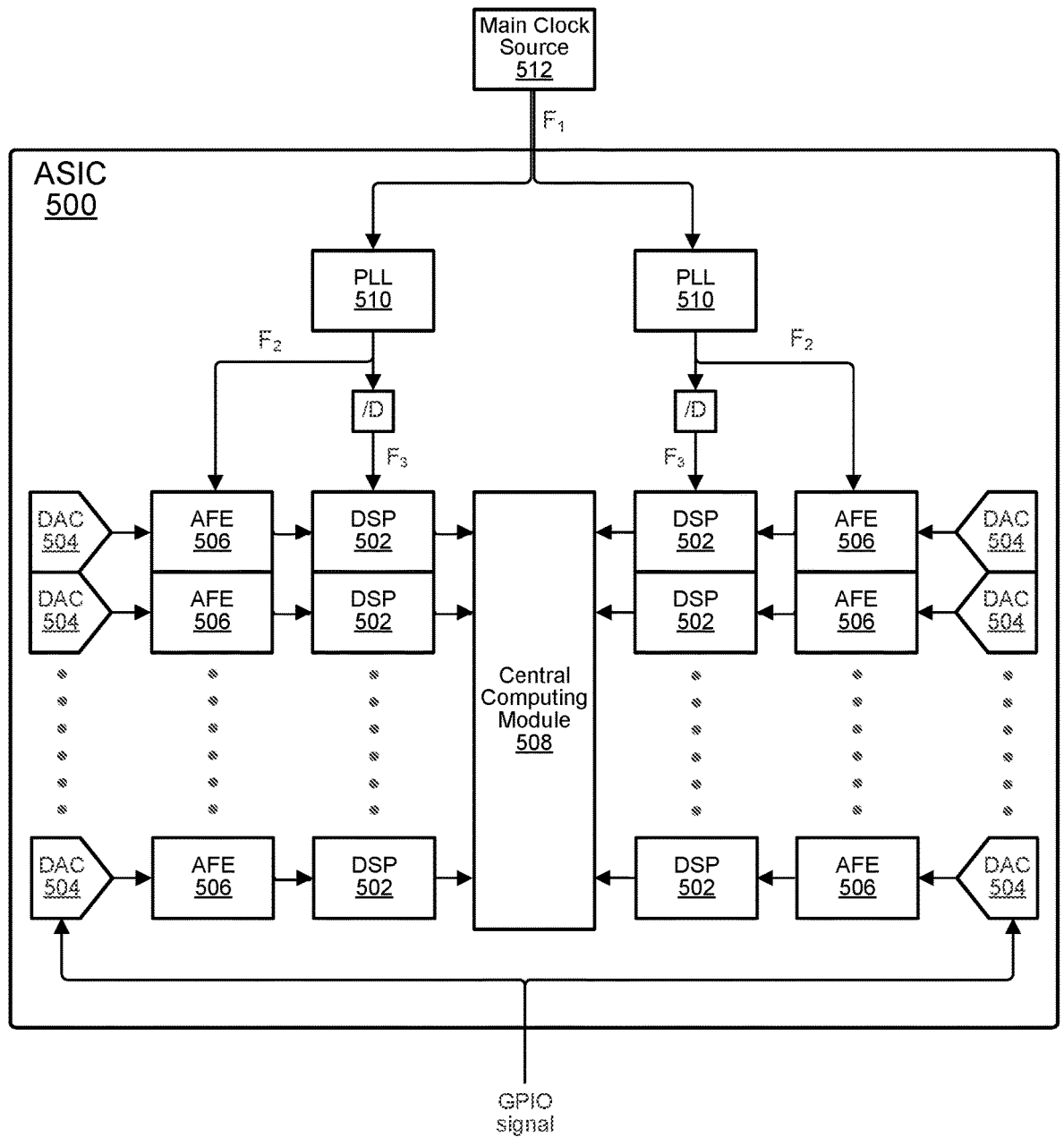
FIG. 6 is another block diagram of an ASIC, according to example embodiments.

FIG. 6 shows such an example arrangement for providing such a synchronization-pulse signal with respect to a given ASIC 500. As shown in FIG. 6, the ASIC could be configured to receive an MCU synchronization-pulse signal as a GPIO signal and to pass that synchronization-pulse signal to all of the DSPs associated DACs. This digital synchronization-pulse signal could have an edge where the signal rises from 0 to 1. Each DAC 504 could then convert that digital signal to an analog DAC current synchronization-pulse, such as by mapping 0 to zero current and mapping 1 to a non-zero current. The associated AFE 506 could then convert this DAC synchronization-pulse to a digital signal likewise with an edge representing the synchronization pulse and could provide the digital signal to the DSP 502, and the DSP 502 could use its respective reference clock to determine and record a timestamp of the synchronization pulse.

A goal here may be to have the synchronization pulse arrive simultaneously at the various DSPs 502 on the ASIC(s) 500, so that the various DSPs 502 can record their respective timestamps at the same moment as each other. This goal can be achieved through suitable chip and PCB design. However, it should be understood that the concept of two signal events being "simultaneous" may have some practical design tolerance and may or may not mean that they occur at exactly the same moment as each other. With a lidar system as discussed herein, a design goal could be to have the difference in time of arrival of the synchronization-pulse signal at the various DACs 504 be an order of magnitude shorter than the speed of light. For example, given that the speed of light is 15 centimeters per nanosecond, the DACs 504 could be considered to "simultaneously" receive the synchronization-pulse signal if they receive the synchronization-pulse signal within 100 or 200 picoseconds of each other. Other thresholds for "simultaneous" could be set as well, depending on the circumstances and keeping the present goal in mind.

Each DSP 502 could be configured such that, when the DSP 502 receives this synchronization pulse signal, the DSP 502 could determine and record a respective synchronization-pulse timestamp of the digital synchronization pulse according to the DSP's respective reference clock and to report that synchronization-pulse timestamp to the central computing module 508 on the DSP's ASIC 500. In line with the discussion above, given each DSP's respective synchronization-pulse timestamp, the central computing module 508 could then compute a respective time offset per DSP 502. For instance, the computing module 508 could deem one of the DSP's synchronization-pulse timestamps to be a reference timestamp and could compare each DSP's synchronization-pulse timestamp with that reference timestamp, to compute for each DSP 502 a respective time offset as the difference between the DSP's synchronization-pulse timestamp and that reference timestamp. Alternatively, another reference timestamp, such as a predefined timestamp or a timestamp of the MCU output or GPIO input for instance, could be used as the point of comparison to facilitate this.

In a multi-ASIC system, some of this processing for the various ASICs could be conducted by a central computing module on a given one of the ASICs and/or by another processor, for example the MCU noted above, or a CPU, GPU, TPU, or FPGA, among other possibilities. For instance, one of the ASICs could be deemed a main ASIC, and the central computing module 508 of that main ASIC could be deemed a main computing module. Or the MCU or another processor of the system could be deemed a main computing module. With this arrangement, the central computing modules of various ASICs in the system could report their DSPs' respective synchronization-pulse timestamps to the main computing module, and the main computing module could compute the per-DSP time offset by comparison of each DSP's synchronization-pulse timestamp with a reference synchronization-pulse timestamp of a given such DSP, among other possibilities. Further, the main computing module could report these per-DSP time offsets back to the respective ASICs or to one or more other elements of the system or could hold the information for its own use.

As further discussed above, the system could then use DSPs' respective time offsets as a basis to synchronize the timebase of the various DSPs (with "synchronizing" also having some design tolerance like that discussed above). As indicated above, the system could do this in various ways.

For example, the system could provision each DSP 502 respectively with the time offset computed respectively for that DSP 502, and the DSP 502 could be configured to apply that respectively provisioned time offset to correct the DSP's reference clock. For instance, the central computing module 508 of the DSP's ASIC 500 could transmit to the DSP 502 data representing the DSP's respective time offset, and the DSP 502 could receive that transmitted data and adjust its reference clock accordingly, such as by shifting, by the time offset, the phase of the DSP's reference clock signal. By way of example, the DSP 502 could apply digital delay logic to its reference clock signal, which could include (i) feeding the reference clock signal through a number of digital delay stages that the DSP 502 determines would work to shift phase of the reference clock signal by the time offset, (ii) applying a delay locked loop, and/or (iii) applying one or more other hardware or software based signal delaying techniques. This way, the various DSPs' reference clocks could become synchronized with each other, so as to help avoid or minimize the above-noted skew problems in 3D point-cloud generation.

As another example, the system could provision each DSP 502 respectively with the time offset computed respectively for that DSP 502, and each DSP 502 could be configured to apply that respectively provisioned time offset to adjust each lidar detection timestamp that the DSP 502 determines or, if the DSP 502 determines the time-of-flight for a respective lidar return pulse, to adjust that time-of-flight calculation. For instance, if a DSP's respective time offset represents the DSP's reference clock being ahead of reference time by a particular delta, that may mean that a detection timestamp recorded by the DSP 502 is erroneously later in time than is should be, which would correlate with a calculated time-of-flight value that is greater than it should be. In this situation, the DSP 502 may apply the time offset to adjust each detection timestamp to be earlier by the delta than what the DSP 502 determined. Alternatively, the DSP may apply the time offset to reduce by the delta each time-of-flight determined by the DSP.

As an alternative example, another component could be configured to make any of these adjustments or another associated adjustment. For instance, if each DSP 502 reports its determined detection timestamp to the central computing module 508 of the DSP's ASIC 500, that central computing module 508 could apply the DSP's respective time offset to adjust each such detection timestamp reported by the DSP 502 or to adjust the associated time-of-flight calculation. Alternatively, if another main computing module will receive each DSP's reported detection timestamp or the associated time-of-flight calculation, that main computing module could adjust each such detection timestamp or time-of-flight calculation.

Optimally through this process, a representative system could thus establish times-of-flight with timebase synchronized across the various DSPs of a given ASIC or among DSPs of various ASICs in a multi-ASIC system, with the times-of-flight computed by the DSPs, central computing modules, or other components. The representative system could then use resulting times-of-flight values, along with other data such as lidar beam direction information, to generate an improved 3D point cloud. For instance, with timebase synchronization as to the various DSPs of a given ASIC, the central computing module on that ASIC could use the improved time-of-flight data as a basis to generate an improved 3D point cloud or a portion of such a point cloud. Further, with timebase synchronization applied to DSPs across various ASICs of a multi-ASIC system, a main computing module of that system could likewise use the improved time-of-flight data as a basis to generate an improved 3D point cloud.

In practice, the representative system could be configured to carry out this process upon power on, periodically, and/or at various other times, in response to various triggers. For instance, the system could be configured to carry out the process just upon power on. Or the system could be configured to carry out the process periodically or otherwise from time to time to help ensure time synchronization between the various processors. Carrying out the process over time could be helpful in an implementation where the differences between the processors' reference clocks change over time, such as with changes in temperature, among other possibilities.

In an example implementation, the system could also monitor the extent to which the differences between the processors' reference clocks change over time and could use that monitored change as a basis to control how often to repeat the process, such as by carrying out the process more often if the differences change more over time and less often if the differences change less over time. Further, the system could monitor temperature or other environmental factors (e.g., using one or more on-die temperature sensors on an ASIC, one or more ambient temperature monitors elsewhere on the PCB, one or more voltage rail or current rail monitors on the PCB, etc.) and could use one or more such monitored environmental factors as a basis to control how often to repeat the process, such as by carrying out the process more often when the temperature or change in temperature over time exceeds a defined threshold, among other possibilities.

Figure 7:
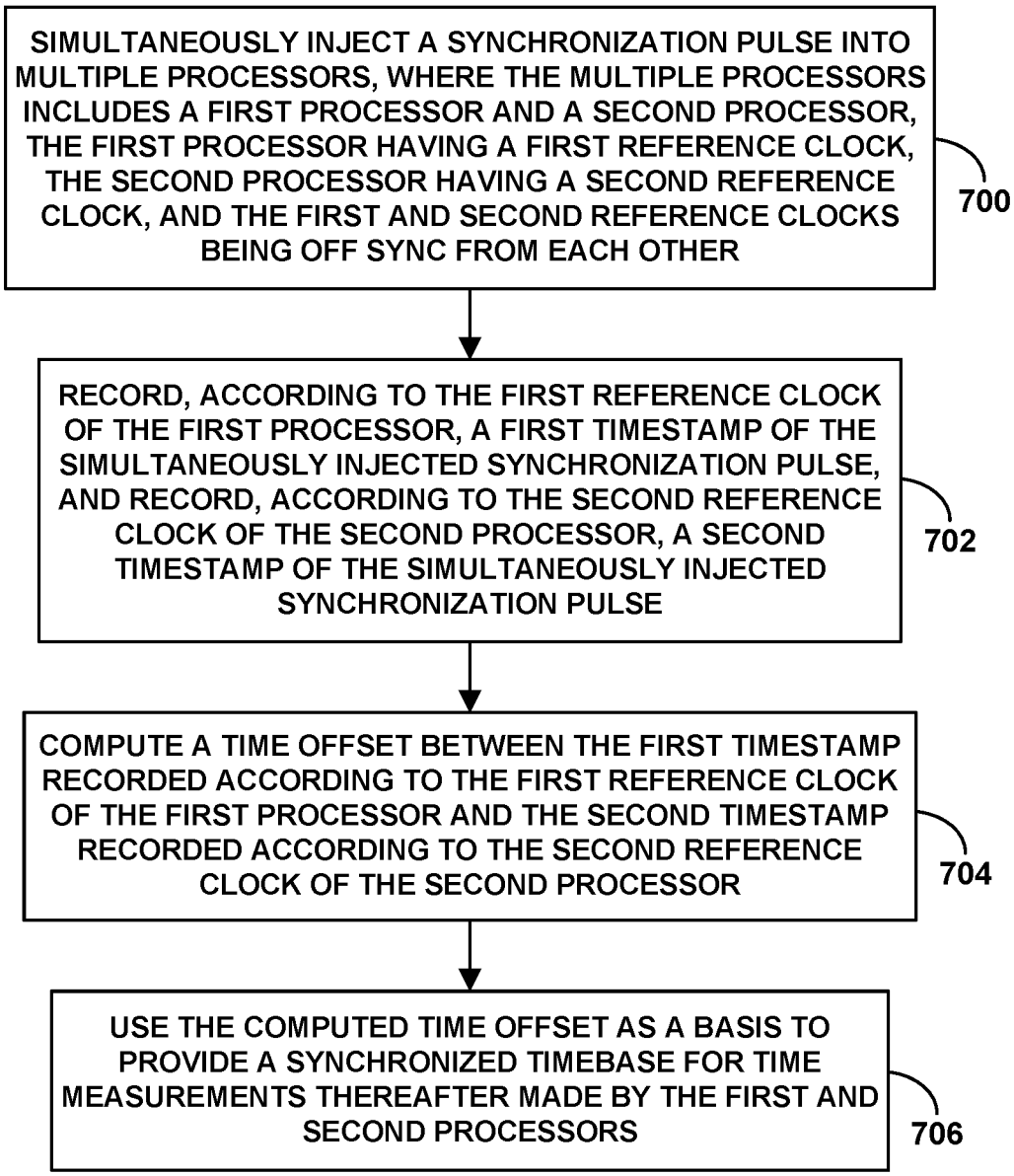
FIG. 7 is a flow chart depicting a method, according to example embodiments.

FIG. 7 is a flow chart depicting a method that could be carried out in accordance with the present disclosure, to provide timebase synchronization for multiple processors in a multi-processor system.

As shown in FIG. 7, at block 700, the method includes simultaneously injecting a synchronization pulse into multiple processors, where the multiple processors includes a first processor and a second processor, the first processor having a first reference clock, the second processor having a second reference clock, and the first and second reference clocks being off sync from each other. Further, at block 702, the method includes recording, according to the first reference clock of the first processor, a first timestamp of the simultaneously injected synchronization pulse and recording, according to the second reference clock of the second processor, a second timestamp of the simultaneously injected synchronization pulse. Still further, at block 704, the method includes computing a time offset between the first timestamp recorded according to the first reference clock of the first processor and the second timestamp recorded according to the second reference clock of the second processor. Yet further, at block 706, the method includes using the computed time offset as a basis to provide a synchronized timebase for time measurements thereafter made by the first and second processors.

In line with the discussion above, the first reference clock of the first processor and the second reference clock of the second processor could operate at the same frequency as each other but could be off-phase from each other.

Further, as discussed above, the act of using the computed time offset as a basis to provide the synchronized timebase for time measurements thereafter made by the first and second processors could involve shifting phase of the second reference clock of the second processor by the time offset.

Yet further, as discussed above, the first processor could use the first reference clock as a basis to determine a first sensor timestamp, the second processor could use the second reference clock as a basis to determine a second sensor timestamp, and the act of using the computed time offset as a basis to provide the synchronized timebase for time measurements thereafter made by the first and second processors could involve adjusting the second timestamp by the time offset.

In addition, as discussed above, the multiple processors in this method could be distributed among multiple chips or could be disposed on a single chip (e.g., an ASIC, etc.)

Figure 8:
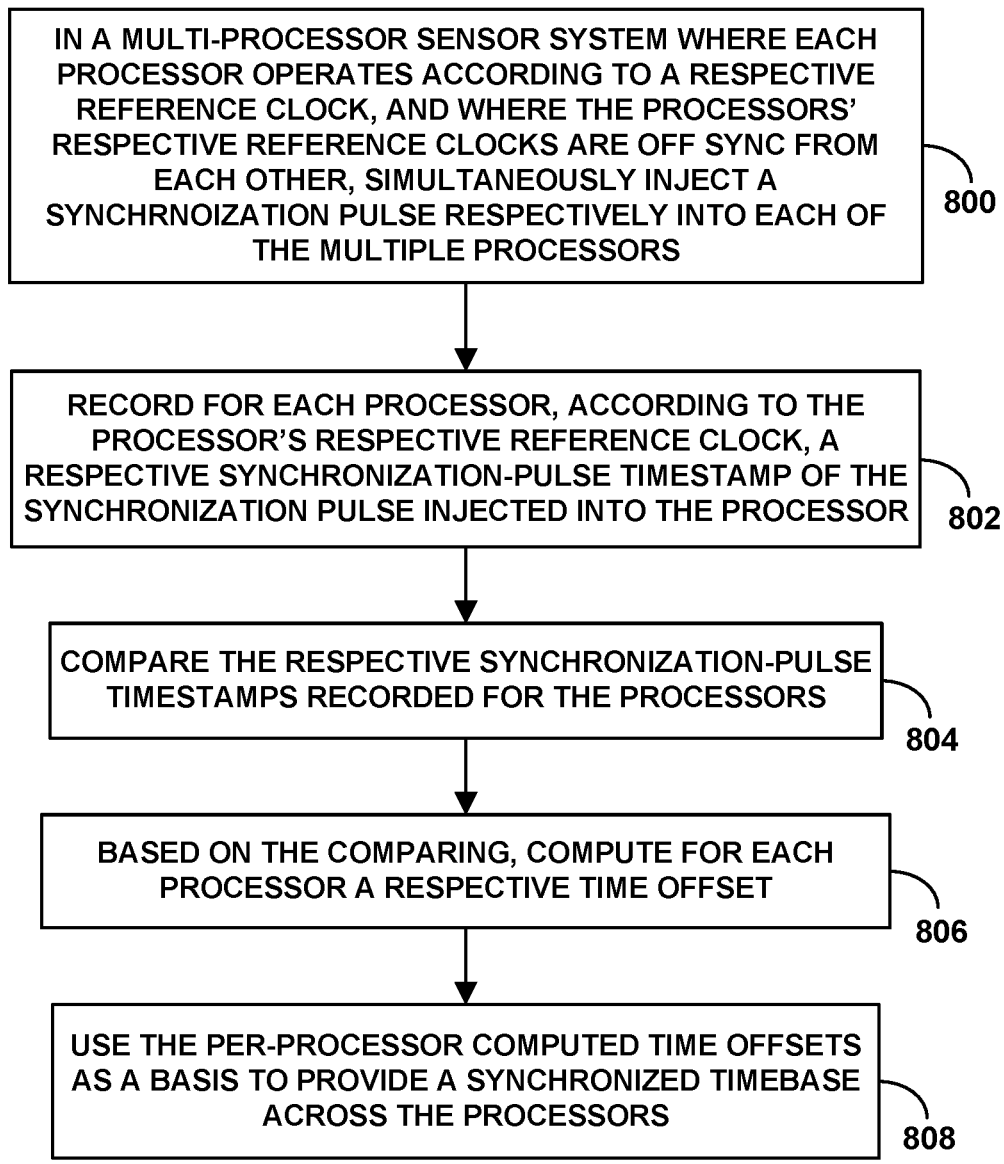
FIG. 8 is another flow chart depicting a method, according to example embodiments.

FIG. 8 is another flow chart depicting a method that could be carried out in accordance with the present disclosure, to provide timebase synchronization for multiple processors in a multi-processor sensor system, where each processor operates according to a respective reference clock, and where the processors' respective reference clocks are off sync from each other.

As shown in FIG. 8, at block 800, the method includes simultaneously injecting a synchronization pulse respectively into each of the multiple processors. Further, at block 802, the method includes recording for each processor, according to the processor's respective reference clock, a respective synchronization-pulse timestamp of the synchronization pulse injected into the processor. Still further, at block 804, the method includes comparing the respective synchronization-pulse timestamps recorded for the processors (e.g., comparing the respective synchronization-pulse timestamps recorded for each of the processors in the plurality as discussed above, etc.). Yet further, at block 806, the method includes, based on the comparing, computing for each processor a respective time offset, and at block 808, the method includes using the per-processor computed time offsets as a basis to provide a synchronized timebase for the processors.

In line with the discussion above, the processors' respective reference clocks in this method may all operate at a common frequency but may be off-phase from each other. In that case, the act of using the computed time offsets as a basis to provide the synchronized timebase across the processors could involve, for each processor, shifting phase of the processor's reference clock by the processor's respective time offset. Alternatively, in a scenario where each processor uses the processor's respective reference clock as a basis to determine for the processor a respective sensor timestamp, the act of using the computed time offsets as a basis to provide the synchronized timebase across the processors could involve, for each processor, adjusting the processor's respective sensor timestamp by the processor's respective time offset.

In addition, as noted above, the method could also include monitoring an extent to which the differences between the processors' reference clocks change over time and could use that monitored change as a basis to control how often to repeat the process, such as by carrying out the process more often if the differences change more over time and less often if the differences change less over time.

Further, as discussed above, the processors of this multi-processor sensor system could be distributed among multiple chips—such as on multiple ASICs for instance.

As discussed above, the various principles discussed above could be accordingly applied by way of example in the context of a multi-processor system. Such a system could include at least one ASIC, multiple processors banks of DSPs respectively on each of the at least one ASIC, the multiple banks of DSPs including at least a first bank of DSPs and a second bank of DSPs, each of the first and second bank of DSPs could include one or more DSPs, the DSPs on each of the at least one ASIC could be configured to compute times-of-flight of lidar return signals that are reflections of concurrently transmitted light pulses, with each DSP being configured to compute time-of-flight of a respective one of the lidar return signals.

The system could further include multiple clock sources that provide clock signals to the DSPs, each bank of DSPs having a respective clock source that provides a respective clock signal to the one or more DSPs of the bank, where the clock signals as received by the DSPs define reference clocks including a first reference clock of a first one of the DSPs and a second reference clock of a second one of the DSPs, and where the first reference clock and second reference clock and are off sync from each other.

Still further, the system could include a timebase synchronization subsystem having a synchronization-pulse injector and a computing module. The synchronization-pulse injector could be configured to simultaneously inject a synchronization pulse into the multiple DSPs, the first DSP could be configured to record, according to the first reference clock of the first DSP, a first timestamp of the simultaneously injected synchronization pulse, and the second DSP could be configured to record, according to the second reference clock of the second DSP, a second timestamp of the simultaneously injected synchronization pulse. In addition, the computing module could be configured to compute a time offset between the first timestamp recorded according to the first reference clock of the first DSP and the second timestamp recorded according to the second reference clock of the second DSP and to use the computed time offset as a basis to provide a synchronized timebase for time measurements thereafter made by the first and second DSPs.

Yet further, the time offset could be considered a first time offset, the reference clocks could additionally include a third reference clock of a third one of the DSPs, the third reference clock could be off sync from the first and second reference clocks, the third DSP could be configured to record, according to the third reference clock of the third DSP, and a third timestamp of the simultaneously injected synchronization pulse. The computing module could then be configured to compute a second time offset between the first timestamp recorded according to the first reference clock of the first DSP and the third timestamp recorded according to the third reference clock of the third DSP and to use the computed second time offset as a basis to provide a synchronized timebase for time measurements thereafter made by the first and third DSPs.

In line with the discussion above, the multi-processor system could include multiple ASICs. The first and second DSPs could then be on a common ASIC or on separate ASICs. Further, if on a common ASIC, the first and second DSPs could be in separate banks of DSPs or in a common bank of DSPs.

Further, as discussed above, the first reference clock of the first DSP and the second reference clock of the second DSP could operate at the same frequency as each other but could be off-phase from each other and thus out of sync with each other. Further, the act of computed time offset as a basis to provide the synchronized timebase for time measurements thereafter made by the first and second DSPs could involve shifting phase of the second reference clock of the second DSP by the time offset. Still further, the first DSP could be configured to use the first reference clock as a basis to determine a first sensor timestamp, the second DSP could be configured to use the second reference clock as a basis to determine a second sensor timestamp, and the act of using the computed time offset as a basis to provide the synchronized timebase for time measurements thereafter made by the first and second DSPs could involve adjusting the second timestamp by the time offset.

In addition, the timebase synchronization subsystem could be configured to carry out the operations of simultaneously injecting of the synchronization pulse into the plurality of DSPs, computing of the time offset between the first timestamp and the second timestamp, and using of the computed time offset as a basis to provide a synchronized timebase for time measurements thereafter made by the first and second DSPs at various times, such as upon power, periodically, and/or in response to one or more trigger events.

More particularly, the various principles discussed above could be accordingly applied by way of example in the context of a multi-processor lidar system. As noted above, such a system could include one or more ASICs, multiple banks of DSPs respectively on each ASIC, the multiple banks of DSPs including at least a first bank of DSPs and a second bank of DSPs, where the DSPs on each of the one or more ASICs are configured to compute times-of-flight of lidar return signals that are reflections of concurrently transmitted light pulses, with each DSP being configured to compute time-of-flight of a respective one of the lidar return signals, and the computed times-of-flight mapping to point-cloud information for an object in a surrounding environment.

As discussed above, such a system could then also include clock sources that provide clock signals to the DSPs, including for each bank of DSPs a respective clock source that provides a respective clock signal to the DSPs of the bank, with the clock signals as received by a plurality of the DSPs defining reference clocks of the DSPs but being be off sync from each other. To help address this synchronization issue, the system could also include a timebase synchronization subsystem that includes (i) a synchronization-pulse injector configured to simultaneously inject a synchronization pulse respectively into each of the multiple DSPs, each DSP being configured to determine, according to the DSP's reference clock, a respective synchronization-pulse timestamp of the synchronization pulse injected into the DSP and (ii) a computing module configured to compare the respective synchronization-pulse timestamps determined by the multiple DSPs, to compute for each DSP a respective time offset based on the comparing, and to use the computed time offsets as a basis to synchronize timebase across the DSPs.

In an example implementation as discussed above, the synchronization-pulse injector may include an MCU as noted above, which could output the synchronization pulse for transmission through a GPIO pin respectively of each of the one or more ASICs. Further, in some implementations, the synchronization-pulse injector could be considered to include one or more components, such as the DACs, AFEs, and trace routing noted above for instance, that may feed the synchronization pulse from the GPIO pin to the various DSPs. Further, the computing module could be a central computing module on a given ASIC and/or another module such as the MCU discussed above.

As further discussed above, in the multi-processor lidar system, the DSPs' respective reference clocks may all operate at a common frequency but be off phase from each other, in which case using the computed time offsets as a basis to synchronize the timebase across the DSPs could involve, for each DSP, shifting phase of the DSP's respective reference clock by the time offset computed respectively for the DSP.

In addition, as discussed above, the act of each DSP computing the time-of-flight of the respective one of the lidar return signals could involve the DSP determining according to the DSP's respective reference clock a receive-timestamp of the respective lidar return signal. Further, the act of using the computed time offsets as a basis to synchronize the timebase across the DSPs could involve, for each DSP, adjusting the DSP's determined receive-timestamp by the DSP's respective time offset.

Still further, as discussed above, the timebase synchronization subsystem of the example multi-processor lidar system could be configured to carry out the acts of simultaneously injecting the synchronization-pulse signal and computing and using the time offsets upon power on. Further or alternatively, the timebase synchronization subsystem could be configured to repeat the acts of simultaneously injecting and computing and using the time offsets, perhaps periodically and/or in response to one or more other trigger events.

Various other features described herein could be implemented in this context as well, and vice versa.

Further, the present disclosure also contemplates a non-transitory computer readable medium having encoded thereon instructions executable by one or more processors to carry out operations as described herein.

By way of example, the operations could include determining synchronization-pulse timestamps upon simultaneous injection of a synchronization pulse into a plurality of processors, where the plurality of processors includes a first processor and a second processor, the first processor having a first reference clock, the second processor having a second reference clock, and the first and second reference clocks being off sync from each other, and wherein determining the timestamps includes determining a first timestamp of the simultaneously injected synchronization pulse according to the first reference clock of the first processor and determining a second timestamp of the simultaneously injected synchronization pulse according to the second reference clock of the second processor. Further, the operations could include computing a time offset between the first timestamp determined according to the first reference clock of the first processor and the second timestamp determined according to the second reference clock of the second processor. Yet further, the operations could include using the computed time offset as a basis to provide a synchronized timebase for time measurements thereafter made by the first and second processors.

In line with the discussion above, the processors in this arrangement could be one or more chips (e.g., ASICs, etc.). For instance, the processors could be distributed among multiple chips.

Further, as discussed above, the first reference clock of the first processor and the second reference clock of the second processor could operate at the same frequency as each other but could be off-phase from each other. Still further, the act of using the computed time offset as a basis to provide the synchronized timebase for time measurements thereafter made by the first and second processors could involve shifting phase of the second reference clock of the second processor by the time offset. Yet further, the first processor could use the first reference clock as a basis to determine a first sensor timestamp, the second processor could use the second reference clock as a basis to determine a second sensor timestamp, and the act of using the computed time offset as a basis to provide the synchronized timebase for time measurements thereafter made by the first and second processors could involve adjusting the second timestamp by the time offset.

Various other features described herein could be implemented in this context as well, and vice versa.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
    determining timestamps upon simultaneous injection of a synchronization pulse into a plurality of processors, wherein the plurality of processors includes a first processor and a second processor, the first processor having a first reference clock, the second processor having a second reference clock, and the first and second reference clocks being off sync from each other, and wherein determining the timestamps includes determining a first timestamp of the simultaneously injected synchronization pulse according to the first reference clock of the first processor and determining a second timestamp of the simultaneously injected synchronization pulse according to the second reference clock of the second processor;
    computing a time offset between the first timestamp determined according to the first reference clock of the first processor and the second timestamp determined according to the second reference clock of the second processor; and
    using the computed time offset as a basis to provide a synchronized timebase for time measurements thereafter made by the first and second processors.

2. The method of claim 1, wherein the first reference clock of the first processor and the second reference clock of the second processor operate at a same frequency as each other and are off-phase from each other.

3. The method of claim 2, wherein using the computed time offset as a basis to provide the synchronized timebase for time measurements thereafter made by the first and second processors comprises shifting phase of the second reference clock of the second processor by the time offset.

4. The method of claim 2, wherein the first processor uses the first reference clock as a basis to determine a first sensor timestamp, wherein the second processor uses the second reference clock as a basis to determine a second sensor timestamp, and wherein using the computed time offset as a basis to provide the synchronized timebase for time measurements thereafter made by the first and second processors comprises adjusting the second sensor timestamp by the time offset.

5. The method of claim 1, wherein the plurality of processors are distributed among multiple chips.

6. A timebase synchronization system comprising:
    a computing module having a communication link with each processor in a plurality of processors, the plurality of processors including a first processor and a second processor,
    wherein the computing module is configured to determine timestamps upon simultaneous injection of a synchronization pulse into the plurality of processors, the first processor having a first reference clock, the second processor having a second reference clock, and the first and second reference clocks being off sync from each other, and wherein determining the timestamps includes determining a first timestamp of the simultaneously injected synchronization pulse according to the first reference clock of the first processor and determining a second timestamp of the simultaneously injected synchronization pulse according to the second reference clock of the first processor, wherein the computing module is configured to compute a time offset between the first timestamp determined according to the first reference clock of the first processor and the second timestamp determined according to the second reference clock of the second processor, and wherein the computing module is configured to use the computed time offset as a basis to provide a synchronized timebase for time measurements thereafter made by the first and second processors.

7. The timebase synchronization system of claim 6, wherein the processors in the plurality of processors are distributed among multiple chips.

8. The timebase synchronization system of claim 6, wherein the first processor is in a first bank of processors of an application specific integrated circuit (ASIC) and the second processor is in a second bank of processors of the ASIC.

9. The timebase synchronization system of claim 6, wherein the first processor is on a first application specific integrated circuit (ASIC) and the second processor is on a second ASIC.

10. The timebase synchronization system of claim 6, wherein the first reference clock of the first processor and the second reference clock of the second processor operate at a same frequency as each other and are off-phase from each other.

11. The timebase synchronization system of claim 10, wherein using the computed time offset as a basis to provide the synchronized timebase for time measurements thereafter made by the first and second processors comprises shifting phase of the second reference clock of the second processor by the time offset.

12. The timebase synchronization system of claim 10, wherein the first processor is configured to use the first reference clock as a basis to determine a first sensor timestamp, wherein the second processor is configured to use the second reference clock as a basis to determine a second sensor timestamp, and wherein using the computed time offset as a basis to provide the synchronized timebase for time measurements thereafter made by the first and second processors comprises adjusting the second sensor timestamp by the time offset.

13. The timebase synchronization system of claim 6, wherein the computing module is selected from the group consisting of a graphics processing unit (GPU), and central processing unit (CPU), a tensor processing unit (TPU), and a field programmable gate array (FPGA).

14. A non-transitory computer-readable medium having encoded thereon instructions executable to carry out operations comprising:

determining timestamps upon simultaneous injection of a synchronization pulse into a plurality of digital signal processors (DSPs) that are disposed on at least one application specific integrated circuit (ASIC), wherein the plurality of DSPs includes a first DSP and a second DSP, the first DSP having a first reference clock, the second DSP having a second reference clock, and the first and second reference clocks being off sync from each other, and wherein determining the timestamps includes determining a first timestamp of the simultaneously injected synchronization pulse according to the first reference clock of the first DSP and determining a second timestamp of the simultaneously injected synchronization pulse according to the second reference clock of the second DSP;

computing a time offset between the first timestamp determined according to the first reference clock of the first DSP and the second timestamp determined according to the second reference clock of the second DSP; and using the computed time offset as a basis to provide a synchronized timebase for time measurements thereafter made by the first and second DSPs.

15. The non-transitory computer-readable medium of claim 14, wherein the DSPs in the plurality of DSPs are distributed among multiple chips.

16. The non-transitory computer-readable medium of claim 14, wherein the at least one ASIC includes a given ASIC, wherein the first DSP is in a first bank of DSPs of the given ASIC, and the second DSP is in a second bank of DSPs of the given ASIC.

17. The non-transitory computer-readable medium of claim 14, wherein the at least one ASIC is multiple ASICs.

18. The non-transitory computer-readable medium of claim 14, wherein the first reference clock of the first DSP and the second reference clock of the second DSP operate at a same frequency as each other and are off-phase from each other.

19. The non-transitory computer-readable medium of claim 18, wherein using the computed time offset as a basis to provide the synchronized timebase for time measurements thereafter made by the first and second DSPs comprises shifting phase of the second reference clock of the second DSP by the time offset.

20. The non-transitory computer-readable medium of claim 14, wherein the first DSP uses the first reference clock as a basis to determine a first sensor timestamp, wherein the second DSP uses the second reference clock as a basis to determine a second sensor timestamp, and wherein using the computed time offset as a basis to provide the synchronized timebase for time measurements thereafter made by the first and second DSPs comprises adjusting the second sensor timestamp by the time offset.

\* \* \* \* \*

UNITED STATES PATENT AND TRADEMARK OFFICE
CERTIFICATE OF CORRECTION

| | | |
|---|---|---|
| PATENT NO. | : 12,169,420 B2 | Page 1 of 1 |
| APPLICATION NO. | : 18/473591 | |
| DATED | : December 17, 2024 | |
| INVENTOR(S) | : David Sobel et al. | |

It is certified that error appears in the above-identified patent and that said Letters Patent is hereby corrected as shown below:

On the Title Page

Item (72) "Pieter Kaspenberg" should be corrected to read --Pieter Kapsenberg--

Signed and Sealed this
Third Day of June, 2025

Coke Morgan Stewart
*Acting Director of the United States Patent and Trademark Office*